United States Patent
Wang et al.

(10) Patent No.: US 12,500,530 B1
(45) Date of Patent: Dec. 16, 2025

(54) TRIBOELECTRIC GENERATOR SYSTEMS AND METHODS FOR ENERGY HARVESTING AND SENSING APPLICATIONS

(71) Applicant: Board of Trustees of UA, for and on behalf of UAH, Huntsville, AL (US)

(72) Inventors: Gang Wang, Madison, AL (US); Yu Lei, Madison, AL (US); Moonhyung Jang, Madison, AL (US); Jacob Lee, Toney, AL (US)

(73) Assignee: Board of Trustees of UA, for and on behalf of UAH, Huntsville, AL (US)

( * ) Notice: Subject to any disclaimer, the term of this patent is extended or adjusted under 35 U.S.C. 154(b) by 0 days.

(21) Appl. No.: 18/416,376

(22) Filed: Jan. 18, 2024

Related U.S. Application Data

(63) Continuation of application No. 17/939,777, filed on Sep. 7, 2022, now Pat. No. 11,929,691.

(60) Provisional application No. 63/313,550, filed on Feb. 24, 2022, provisional application No. 63/241,227, filed on Sep. 7, 2021.

(51) Int. Cl.
*H02N 1/04* (2006.01)
(52) U.S. Cl.
CPC ..................... *H02N 1/04* (2013.01)
(58) Field of Classification Search
CPC ....................................................... H02N 1/04
USPC ................................................. 310/309, 310
See application file for complete search history.

(56) References Cited

U.S. PATENT DOCUMENTS

| | | | |
|---|---|---|---|
| 11,929,691 B1 | 3/2024 | Wang et al. | |
| 2011/0050181 A1* | 3/2011 | Post | H02N 1/04 320/166 |
| 2013/0049531 A1* | 2/2013 | Wang | H02N 1/04 310/309 |
| 2017/0331397 A1* | 11/2017 | Kim | H02N 2/18 |
| 2017/0359001 A1* | 12/2017 | Wang | C23C 16/045 |

FOREIGN PATENT DOCUMENTS

CN 111245285 A 6/2020

OTHER PUBLICATIONS

CN 111245285; Kang et al. (Year: 2020).*
(Continued)

*Primary Examiner* — Ahmed Elnakib
(74) *Attorney, Agent, or Firm* — Jon E. Holland; Butler Snow, LLP

(57) ABSTRACT

A triboelectric generator can include respective contact members including a first contact member and second contact member. The respective contact members can be movable with respect to each other such that the respective contact members separate from each other in a first configuration and contact each other in a second configuration. The first contact member can include a first conductive layer and a contact layer. The second contact member can be spaced apart from the first contact member in the first configuration and can include an insulating contact layer and a second conductive layer. The insulating contact layer can be configured to come into contact with the contact layer of the first contact member and the transition of the respective contact members from the first configuration to the second configuration can create triboelectric charges. In some examples, the first contact member can include a non-contact insulating layer.

13 Claims, 24 Drawing Sheets

(56) References Cited

OTHER PUBLICATIONS

Luo et al., "Recent progress of triboelectric nanogenerators: From fundamental theory to practical applications", EcoMat, vol. 2, No. 4, 2020, pp. 1-22.
Dong et al., A Stretchable Yam Embedded Triboelectric Nanogenerator as Electronic Skin for Biomechanical Energy Harvesting and Multifunctional Pressure Sensing:, Advanced Materials., vol. 30, No. 43, 2018, pp. 1-12.
Wang et al., "Triboelectric nanogenerators as flexible power sources", npj Flexible Electronics, vol. 1, 2017, pp. 1-10.
Wang et al., "Acheiving ultrahigh triboelectric charge density for efficient energy harvesting", Nature Communications, vol. 8, No. 1, 2017, pp. 1-8.
Liu et al., "Integrated charge excitation triboelectric nanogenerator", Nature Communications, vol. 10, No. 1, 2019, pp. 1-9.
Wang et al., "Pumping up the charge density of a triboelectric nanogenerator by charge-shuttling", Nature Communications, vol. 11, No. 1, 2020, pp. 1-9.
Camara et al., "Correlation between nanosecond X-ray flashes and stick-slip friction in peeling tape", Nature, vol. 455, No. 7216, 2008, pp. 1089-1092.
Liu, et al., "Quantifying contact status and the air-breakdown model of charge-excitation triboelectric nanogenerators to maximize charge density," Nature Communications, 2020, pp. 1-8.

* cited by examiner

TRIBOELECTRIC GENERATOR SYSTEMS AND METHODS FOR ENERGY HARVESTING AND SENSING APPLICATIONS

RELATED APPLICATIONS

This application is a continuation of and claims priority to U.S. application Ser. No. 17/939,777, entitled "Triboelectric Generator Systems and Methods for Energy Harvesting and Sensing Applications" and filed on Sep. 7, 2022, which is incorporated herein by reference. U.S. application Ser. No. 17/939,777 claims priority to U.S. Provisional Patent Application No. 63/241,227 filed on Sep. 7, 2021, titled "Systems and Methods for Energy Harvesting," and U.S. Provisional Patent Application No. 63/313,550 filed on Feb. 24, 2022, titled "Triboelectric Devices and Methods Using Mount Putty," both of which are incorporated herein by reference.

STATEMENT REGARDING FEDERALLY SPONSORED RESEARCH OR DEVELOPMENT

This invention was made with Government support under contract W9113M-19-C-0087 awarded by the U.S. Army. The Government has certain rights in the invention.

RELATED ART

Small-scale energy harvesting devices have been proposed to power low-power profile electronic systems in many different applications. These applications include structural health monitoring, wearable sensors, and other monitoring systems. Proposed devices can operate standalone to harvest ambient mechanical energy and convert it into electricity to power themselves. One such proposed system is the Triboelectric Nanogenerator ("TENG"), which is a device configured to convert mechanical energy into electrical energy by using the triboelectric effect and electrostatic charges to generate electrical potential by charge transfer between two thin triboelectric layers with opposite polarities. TENG devices operate by allowing the triboelectric layers to repeatedly come into contact and separate. An external circuit can allow electrons to flow between two electrodes on the back side of the respective triboelectric layers in order to equalize the electrical potential between contacts.

However, currently proposed TENG devices have numerous drawbacks. Many TENG devices require complex external circuitry, such as voltage multiplying circuits ("VMC") to boost and stabilize their output voltage. Some currently proposed TENG devices also utilize external pumps to provide additional energy to power themselves. The inclusion of VMCs and external pumps within TENG design detrimentally increase fabrication costs and the environmental impact of TENG production. Traditional TENGs also require sophisticated nano-scale surface treatment to increase intra-contact surface friction and increase the efficiency of triboelectrification between contact layers. Additionally, currently proposed TENG devices suffer from static discharge during separation of the triboelectric layers, which inhibits the production of useful electrical power.

The embodiments disclosed herein are directed to addressing these and other considerations.

BRIEF DESCRIPTION OF THE DRAWINGS

The present disclosure can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1A:
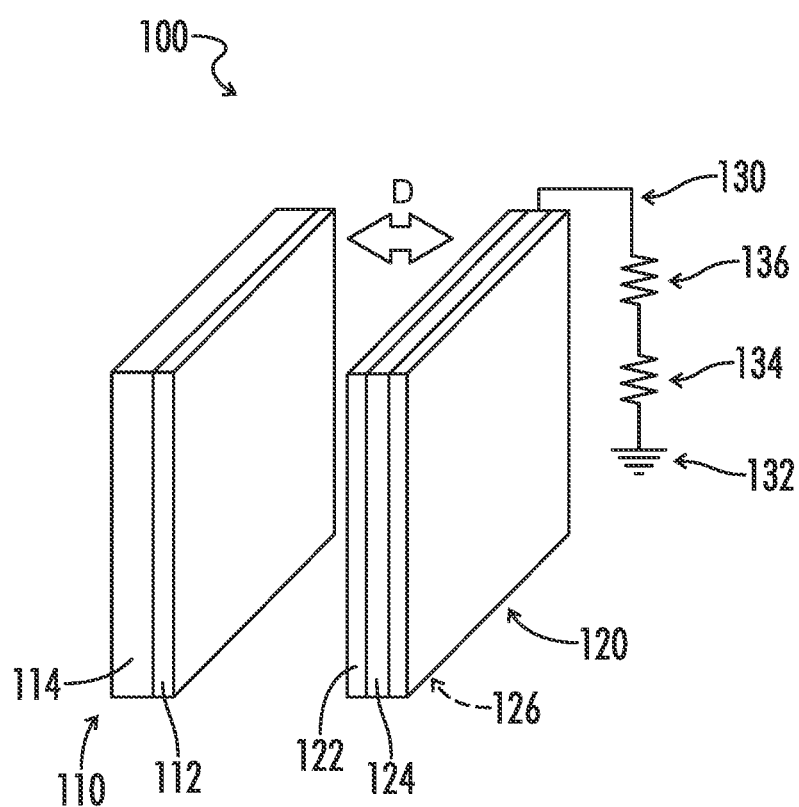
FIG. 1A depicts an exemplary triboelectric generator ("TEG"), according to aspects of the present disclosure.

The present disclosure generally relates to a contact-separation triboelectric generator (TEG). In one exemplary embodiment, the TEG can include a first contact member and a second contact member. The contact members can be movable with respect to each other such that in a first configuration, the respective contact members separate from each other and in a second configuration the respective contact members contact each other. The first contact member can include a first conductive layer and a contact layer adjacent to the first conductive layer. The second contact member can be spaced from the first contact member in the first configuration and can include an insulating contact layer and a second conductive layer adjacent to the insulating layer. The insulating contact layer of the second contact member can be configured to come into contact with the contact layer of the first contact member while in the second configuration. Additionally, the transition of the respective contact members from the first configuration to the second configuration can create a buildup of triboelectric charges on the respective contact members of the disclosed TEG.

Unlike previous TENGs, the TEG described in the present disclosure does not require complex external circuitry, such a voltage multiplier circuit, in order to generate notable power output. Notably, the TEG described in the present disclosure includes a tacky triboelectric contact layer that avoids the need for complex nano-scale surface treatments to achieve suitable performance for triboelectric power generation. By using tacky contact materials that exhibit high friction, an electric double layer can be formed in the TEG during contact. Additionally, by including an insulating contact layer within a contact member, the disclosed TEG can leverage static discharge in order to generate additional power, unlike previous TENGs which produce less power as a result of the static discharge phenomena. Unlike previous TENGs, the TEG described in the present disclosure can allow more electrons to into the circuit during separation of the contact members because of the inclusion of the insulating contact layer.

In another exemplary embodiment, a double-electrode TEG is disclosed. The double-electrode TEG can include a first contact member and a second contact member. The respective contact members can be movable with respect to each other such that in a first configuration the respective contact members separate from each other and in a second configuration the respective contact members contact each other. The first contact member of the double-electrode TEG can include a first conductive layer, a non-contact insulating layer adjacent to the first conductive layer, and a contact layer adjacent to the non-contact insulating layer. Unlike the previous embodiment, the double-electrode TEG can include the non-contact insulating layer, which further increases power generation of the disclosed TEG. In some examples, the double-electrode TEG can include a contact layer that includes nanosize mineral crystal grains.

As used in the present disclosure the term "tacky" and/or "sticky" can be used interchangeably. Tackiness and/or stickiness as used herein can be understood as a property of an adhesive that allows it to adhere to another surface on immediate contact. Tackiness can be considered as the "stickiness" of the adhesive while in a fluid or semi-fluid state. The first stage of tackiness is the wetting stage where the adhesive/tacky material must wet the contact substrate. The initial stage of tackiness is governed by physical-chemical properties such as critical surface tension, viscosity, adhesive thickness, etc. The second stage of tackiness is that of debonding the tacky material from the contact substrate. In this stage, rheological properties of the adhesive can affect the perceived tackiness of a material. The property of tackiness is difficult to explicitly define in absolute units because it is greatly influenced by many parameters, including the nature of the adhesive, the contact substrate properties, the pressure applied between the adhesive and contact substrate, the time of contact, the ambient temperature, and the rate of debonding between the tacky material and the contact substrate. Although there are not standardized units for measuring tackiness of a material, several standardized tests have been developed to quantify the tackiness of a material. For example, the American Society of Testing and Materials (ASTM) have developed a probe tack test (D2979) and a rolling ball tack test (D3121) to quantify tackiness. The Tag and Label Manufacturers Institute (TLMI) have developed a loop tack tests (LIB1 and LIB2). The Pressure Sensitive Tape Council (PSTC) have developed quick stick (5) and rolling ball tack (6) tests. The European Association of the Self-Adhesive Labeling Industry (FINAT) have developed a loop tack test (FTM), and the Association des Fabricants Europeens de Rubans, Auto-Adhesifs (AFERA) have developed a quick stick test (4015).

FIG. 1A depicts an exemplary TEG 100. As shown by FIG. 1, TEG 100 includes respective contact members including a first contact member 110 and a second contact member 120. The first contact member 110 and the second contact member 120 are shown in a first configuration, in which the respective contact members 110, 120 are spaced therefrom at a gap distance D. As shown in FIG. 1, the second contact member 120 can be connected to circuit 130, which can be utilized in order to measure performance characteristics of TEG 100. The first contact member 110 can further included a contact layer 112 and a conductive layer 114. In some examples, the contact layer 112 can be a tacky or sticky material, which allows for greater power generation when compared to traditional contact layers used in at least some previous TENG devices. In examples with a tacky contact layer 112, the tackiness of contact layer 112 is capable of generating significant charge compared to non-tacky contact layers 112 utilized in at least some previous TENG designs. Contact layer 112 can be constructed of any suitable material, but in some examples, contact layer 112 can be constructed from an adhesive tape, such as a conventional double-sided tape with an acrylic adhesive layer, although other adhesives are not precluded. The second contact member 120 can include an insulating contact layer 122 that is configured to make contact with contact layer 112 of the first contact member. Adjacent to insulating contact layer 122 can be a second conductive layer 124. Insulating contact layer 122 can be constructed out of a suitable insulating material, for example but not limited to polyethylene terephthalate (PET). Other materials can be used for insulating contact layer 122, for example but not limited to wood, amber, sealing wax, hard rubber, styrene, acrylic, polyurethane, polypropylene, PVC vinyl, silicon, Teflon, and/or silicon rubber. As will be described in more detail with respect to FIGS. 3A-3B, the use of an insulating material in insulating contact layer 122 can be effective to improve power generation over at least some previous TENG devices because insulating contact layer 122 acts as a Schottky barrier to hinder the direct charge transfer between contact layer 112 and conductive layer 124 which can occur when the respective contact members 110, 120 are separated from each other. As a result, current flow occurs during the separation process along the opposite direction with the contact process. Second conductive layer 124 can be any suitable conductive material, for example but not limited to aluminum, steel, copper, silver, and/or indium tin oxide (ITO). Optionally, adjacent to the second conductive layer 124 may be a foam backing layer 126. The first contact member 110 and the second contact member 120 can have a contact area that is approximately between 200 $mm^2$ and 10000 $mm^2$, although other dimensions of the contact area are possible. The gap distance D in TEG 100 can be varied, but is preferably between about 1 mm and about 100 mm, and most preferably set at about 2 mm. As shown in FIG. 1A, the conductive layer 124 can be connected to a circuit 130. Circuit 130 can include a static resistor 134, a ground 132, and a load resistor 136. When testing power characteristics of exemplary TEG 100, circuit 130 can also include an oscilloscope 150, which will be described in further detail with respect to FIGS. 1B and 1C. Static resistor 134 and load resistor 136 can be used to calculate voltage and power generated in circuit 130 by TEG 100 during operation. In some examples, static resistor 134 can have a resistance between approximately 10 ohms and approximately 10000 ohms, and more preferably between approximately 50 ohms and 1000 ohms. In some examples, load resistor 136 can be selected to optimize power generation. Load resistor 136 can be between 1 mega ohm and 10 mega ohm, and most preferably can be 4.0 mega ohm for optimized peak power generated by TEG 100. Power output characteristics of TEG 100 can be measured using an experimental setup as described in more detail with respect to FIGS. 1B-1C.

Figure 1B:
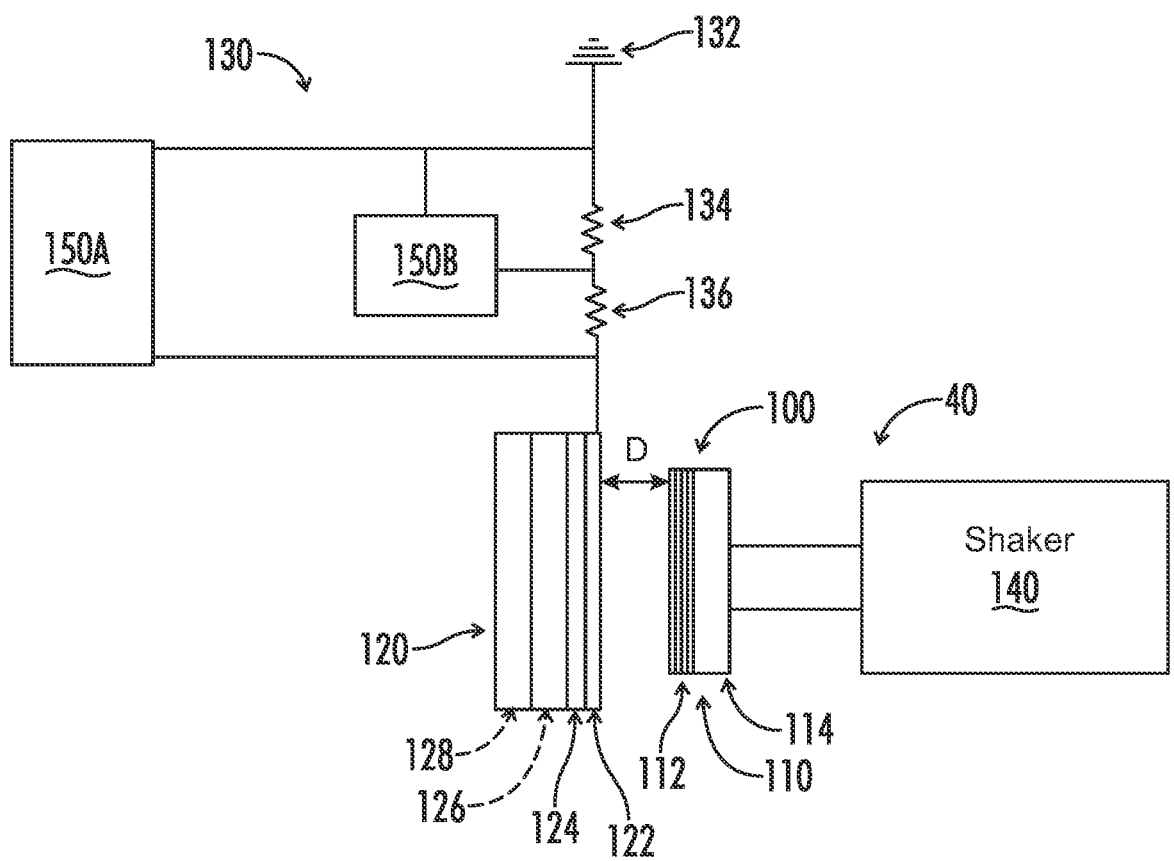
FIG. 1B depicts an exemplary TEG with separated contact members, the TEG driven by a mechanical shaker with power measurements recorded by an oscilloscope, according to aspects of the present disclosure.
Figure 1C:
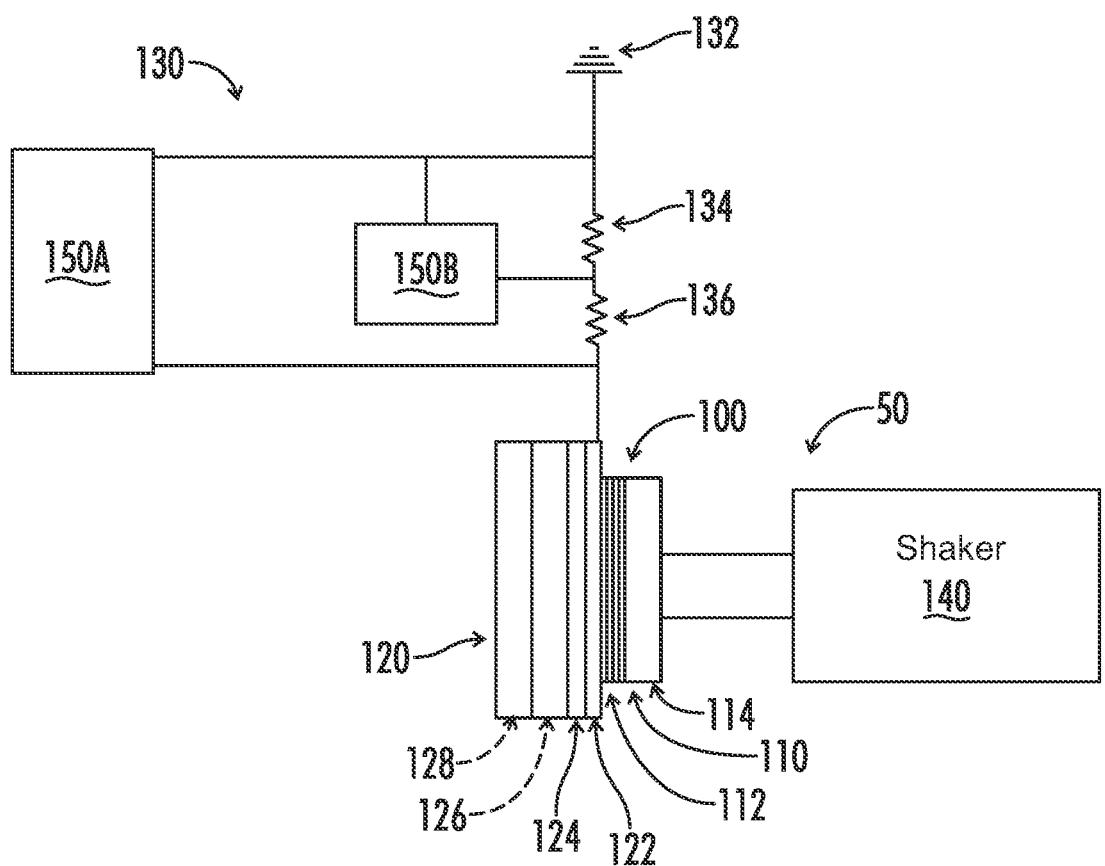
FIG. 1C depicts an exemplary TEG with contacting contact members, the TEG driven by a mechanical shaker with power measurements recorded by an oscilloscope, as depicted in FIG. 1B, according to aspects of the present disclosure.

FIG. 1B depicts exemplary TEG 100 in a first configuration 40 in which respective contact members 110, 120 of TEG 100 are separated by the gap distance D. TEG 100 is shown connected to circuit 130 which can be used to measure power generation characteristics of TEG 100. Included within circuit 130 can be an oscilloscope 150 having a plurality of measurement channels (e.g., 150A, 150B, 150C, 150D, etc.), although it should be understood that oscilloscope 150 can be a single oscilloscope apparatus or the same functionality can be performed with separate oscilloscopes to measure each channel. As shown oscilloscope 150 first channel 150A is connected to measure power characteristics across both static resistor 134 and load resistor 136 and second channel 150B is configured to measure power characteristics across static resistor 134. By calculating voltage across these known resistors, peak power can be calculated according to Ohm's law. As shown in FIG. 1B, TEG 100 is operated (e.g., forced to move from a first, separated configuration 40 to a second, contacting configuration 50) with the use of a shaker 140. Shaker 140 can mechanically move the respective contact members 110, 120 or TEG 100 from the first configuration 40 to the second configuration 50 and back to the first configuration 40 in a cyclic manner at a user-specified frequency. As shown, shaker 140 can preferably be configured to operate at approximately 20 Hz. FIG. 1C depicts TEG 100 in the second, contacting configuration 50 as shaker 140 cyclically moves the respective contact members 110, 120 of TEG 100 together and apart.

Figure 1D:
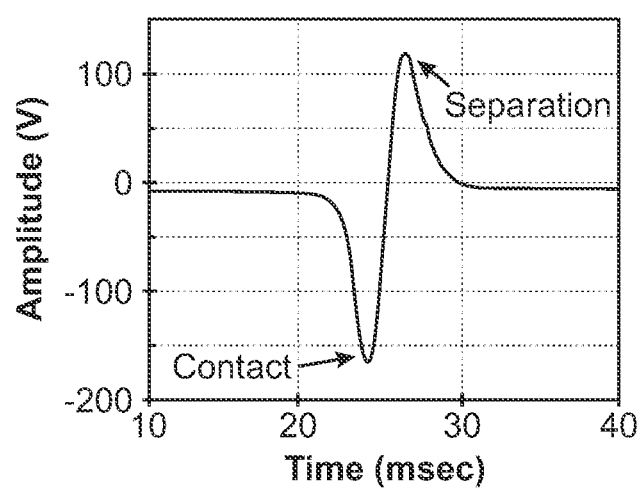
FIG. 1D depicts voltage amplitude of an exemplary TEG as depicted in FIGS. 1A-1C, according to aspects of the present disclosure.

FIG. 1D depicts voltage amplitude of exemplary TEG 100 as depicted in FIGS. 1A-1C. More specifically, FIG. 1D shows voltage as a function of time under 20 Hz oscillation by shaker 140. The load resistor 136 was selected to have 4 mega Ohm resistance because this value load resistor 136 was found to generate optimum power as will be described in more detail with respect to FIG. 4A. Interestingly, the voltage signal shows a large negative value of approximately 166 V in the second, contacting configuration 50. In the first, separate configuration 40 the amplitude of voltage was measured to be approximately 122 V. In comparison to previously disclosed TENG devices, TEG 100 exhibits a near-instantaneous switch between voltage polarities as TEG 100 transitions from second configuration 50 to first configuration 40.

Figure 1E:
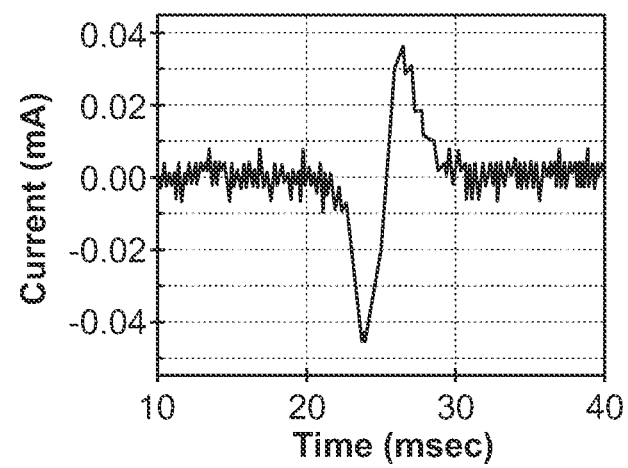
FIG. 1E depicts current values of a function of time during a contact-separation process of an exemplary TEG as depicted in FIGS. 1A-1C, according to aspects of the present disclosure.

FIG. 1E depicts current values of a function of time during the contact-separation process of exemplary TEG 100 as depicted in FIGS. 1A-1C. Current values were then used in order to calculate power as a function of time, which is depicted in FIG. 1F.

Figure 1F:
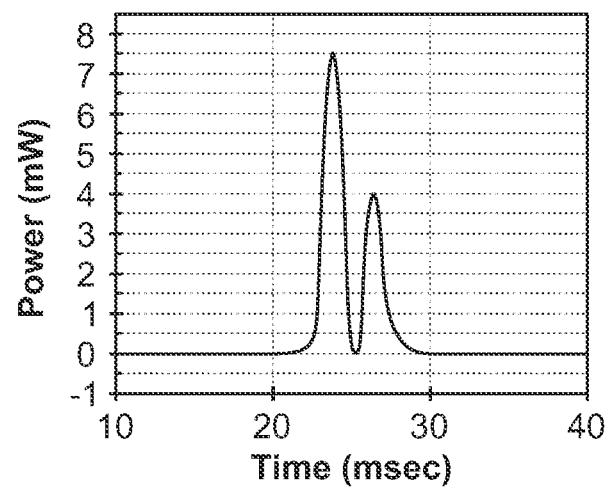
FIG. 1F depicts power output as a function of time during a contact separation process of an exemplary TEG as depicted in FIGS. 1A-1C, according to aspects of the present disclosure.

FIG. 1F depicts power output as a function of time during a contact separation process of an exemplary TEG as depicted in FIGS. 1A-1C. Power was calculated by measuring voltage using oscilloscope 150 and applying Ohm's law. Peak power was calculated as approximately 7.6 mW and a corresponding power density was determined to be approximately 6.2 W/m$^2$ assuming approximately a 35 mm×35 mm contact area between first contact member 110 and second contact members 120. Notably, TEG 100 exhibits favorable power characteristics when compared to existing TENGs without the use of complicated external circuits.

Figure 2:
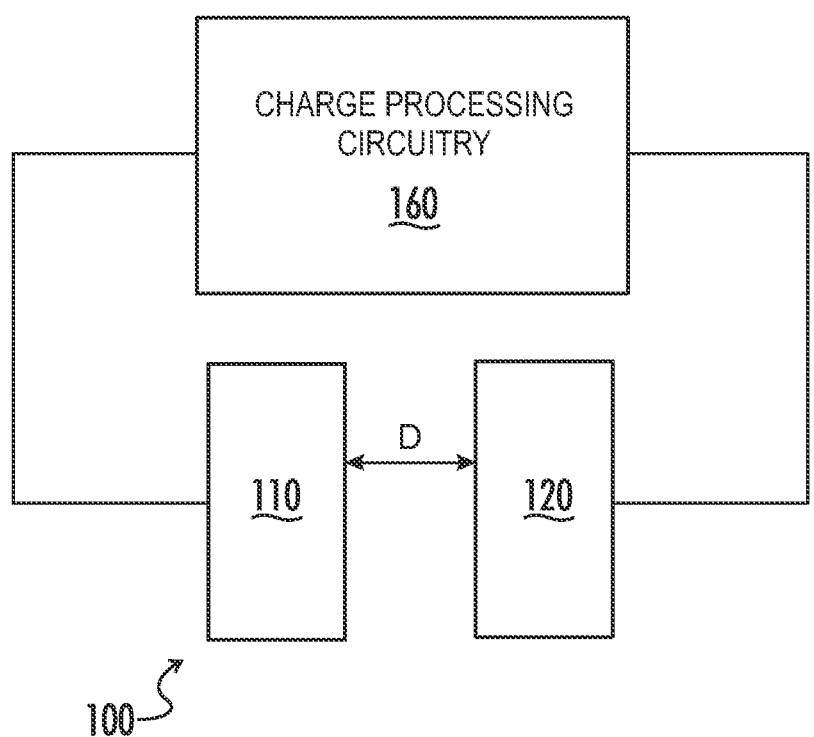
FIG. 2 is a block diagram depicting an exemplary TEG connected to charge processing circuitry for collecting and processing charge output by the TEG, according to aspects of the present disclosure.

FIG. 2 is a block diagram depicting exemplary TEG 100 connected to charge processing circuitry for collecting and processing charge output by the TEG 100, according to aspects of the present disclosure. Charge processing circuitry 160 can be configured to store energy (e.g., energy harvesting) produced by the operation of exemplary TEG 100. In some examples, charge processing circuitry can be configured with logic to enable TEG 100 to be used for sensing and monitoring applications, for example, health monitoring as a wearable device, sensing applications in the automotive and aviation industries, etc. In some examples, charge processing circuitry 160 can include one or more processors and a non-transitory memory storing instructions, that when executed by the one or more processors are configured to enable the disclosed functionality of exemplary TEG 100.

Figure 3A:
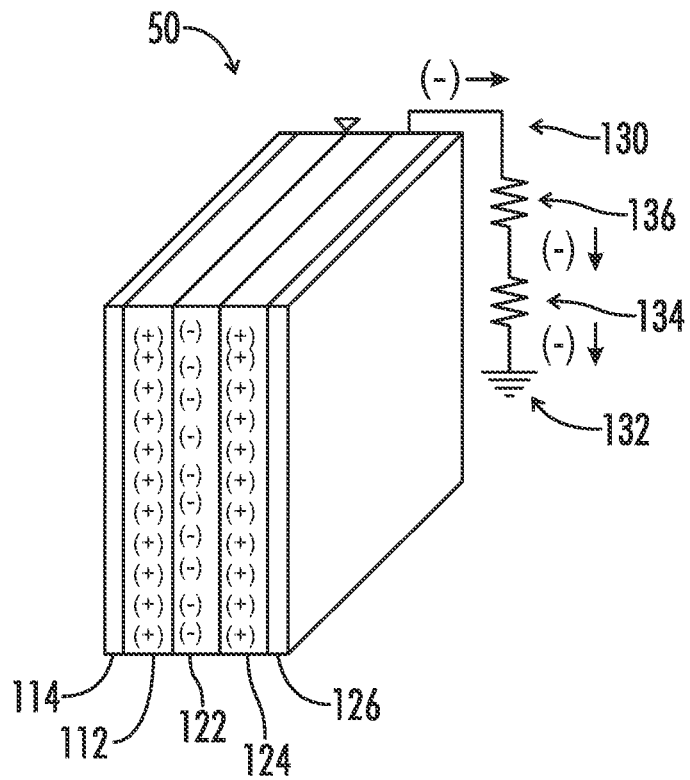
FIG. 3A depicts an exemplary TEG with contacting contact members, according to aspects of the present disclosure.

FIG. 3A depicts an exemplary TEG 100 with contacting contact members 110, 120. More specifically, TEG 100 is shown in a second (e.g., contacting) configuration 50. When in the second configuration 50, the contact layer 112 of the first contact member 110 can generate positive charge and the insulating contact layer 122 of the second contact member 120 can generate a negative charge due to the triboelectric effect. The negative charge of insulating contact layer 122 may induce a positive charge on the second conductive layer 124 by pushing electrons out of the second conductive layer 124 and towards the ground 132.

Figure 3B:
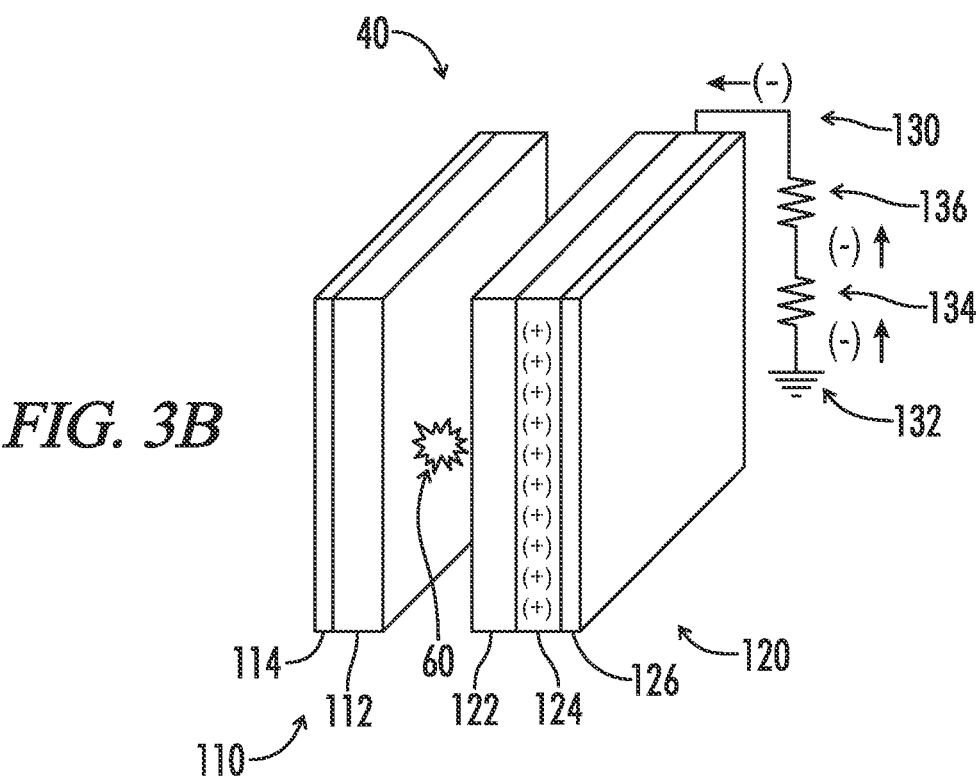
FIG. 3B depicts an exemplary TEG with separated contact members during a static discharge process, according to aspects of the present disclosure.

FIG. 3B depicts an exemplary TEG 100 with separated contact members during a static discharge process. As shown, like previously disclosed TENGs, exemplary TEG 100 can undergo a static discharge event when transitioning from the second configuration 50 to the first configuration 40. That is, an electrical arc or static discharge 60 can occur between the contact layer 112 of the first contact member 110 and the insulating contact layer 122 of the second contact member 120. In contrast to previously disclosed TENGs, the insulating contact layer 122 acts as a Schottky barrier between contact layer 112 and the second conductive layer 124 which therefore allows the charge on the second conductive layer 124 to be conserved during the static discharge 60. Due to the Schottky barrier effect, the second conductive layer remains with a positive charge, which attracts electrons towards the second contact member 120 from ground 132, thereby increasing power generation of TEG 100 over previously disclosed TENGs.

Figure 4A:
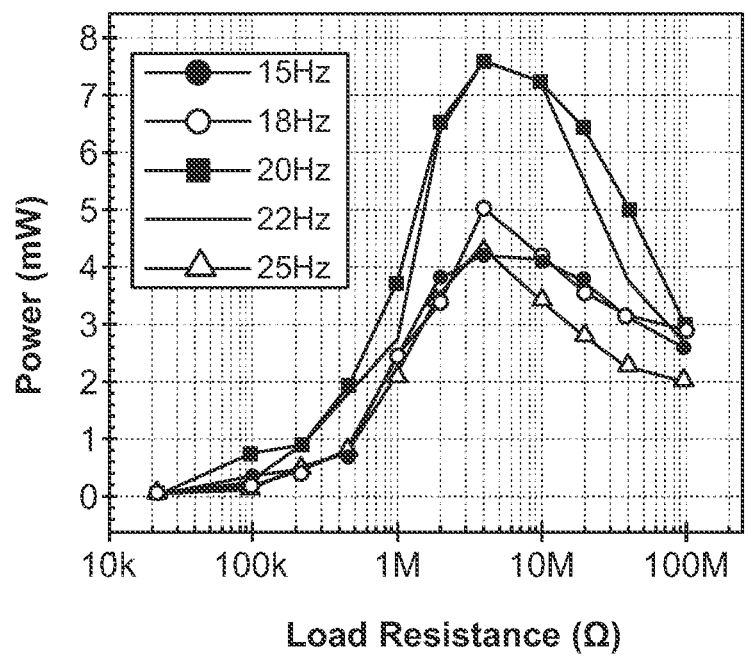
FIG. 4A depicts power generation as a function of load resistance for an exemplary TEG operating at various frequencies, according to aspects of the present disclosure.
Figure 4B:
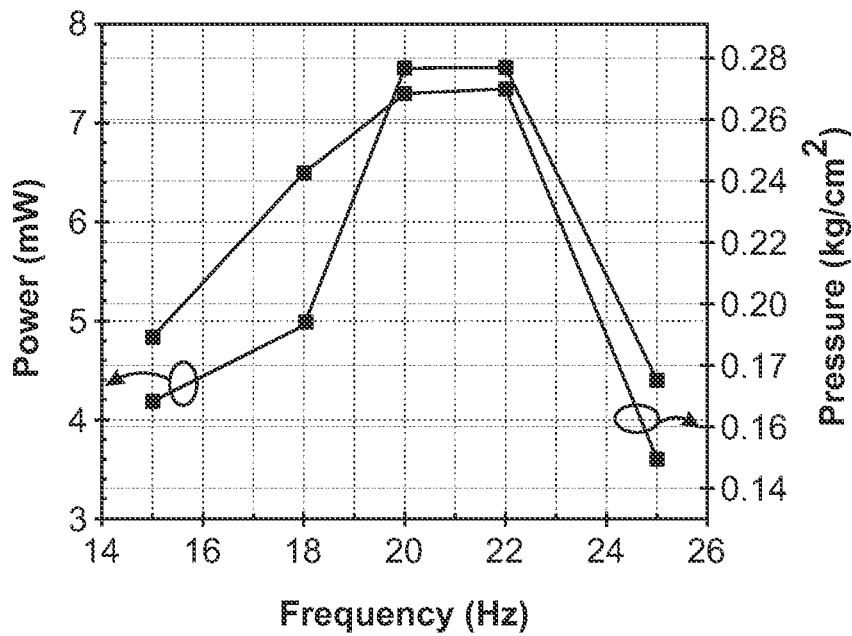
FIG. 4B depicts a comparison of peak power generation and applied pressure for an exemplary TEG as a function of frequency, according to aspects of the present disclosure.

FIG. 4A depicts power generation as a function of load resistance for exemplary TEG 100 operating at various frequencies. As shown, the highest power generation for exemplary TEG 100 occurred at approximately 20 Hz and a load resistance of approximately 4 mega ohm. FIG. 4B depicts a comparison of peak power generation and applied pressure for an exemplary TEG as a function of frequency, according to aspects of the present disclosure. Oscilloscope 150 (e.g., as shown in FIGS. 1B-1C) can be used to measure the pressure between the respective contact member 110, 120 during operation. A. As shown, peak power generation occurs at a frequency of approximately 20 Hz, and it can be seen that increased pressure is correlated to higher power generation.

Figure 5A:
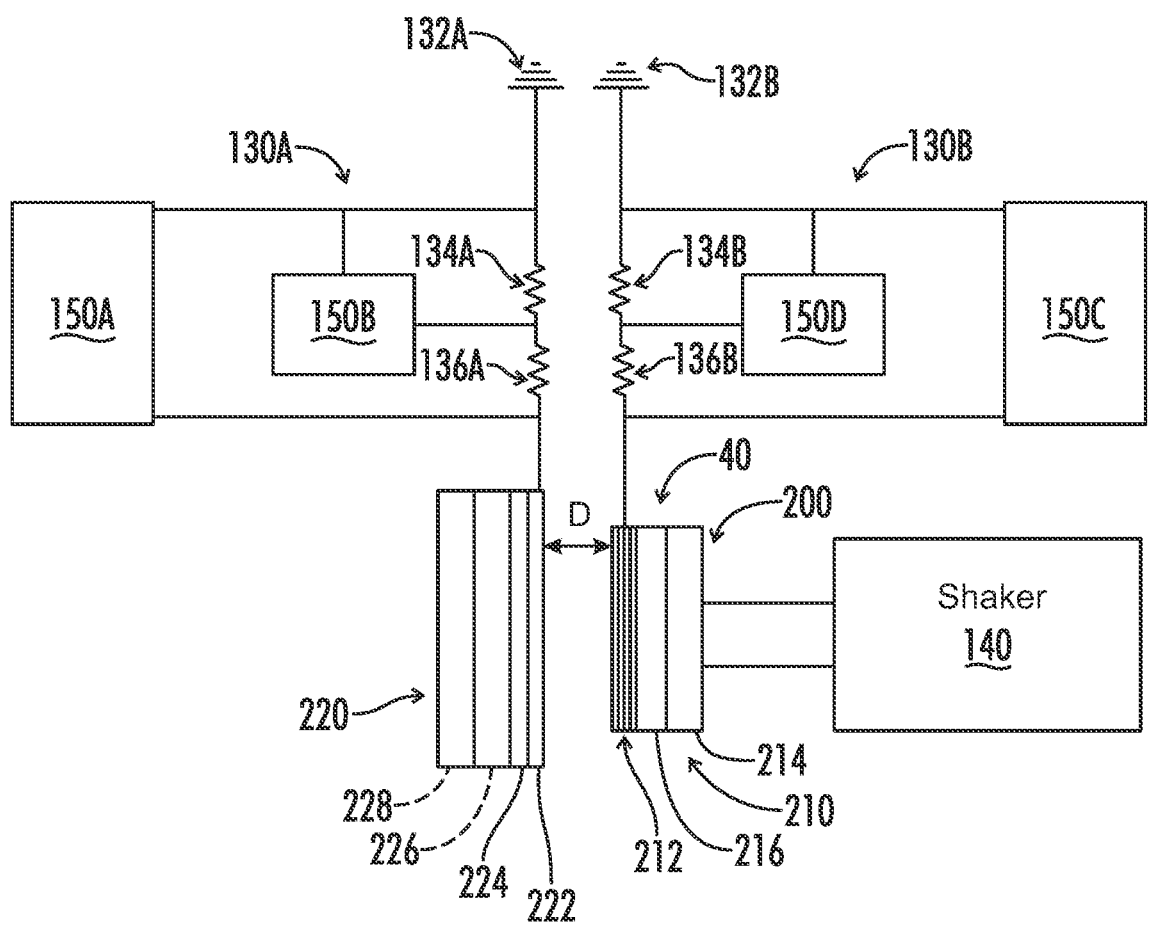
FIG. 5A depicts an exemplary double-electrode TEG with separated contact members, the TEG driven by a mechanical shaker with power measurements recorded by an oscilloscope, according to aspects of the present disclosure.
Figure 5B:
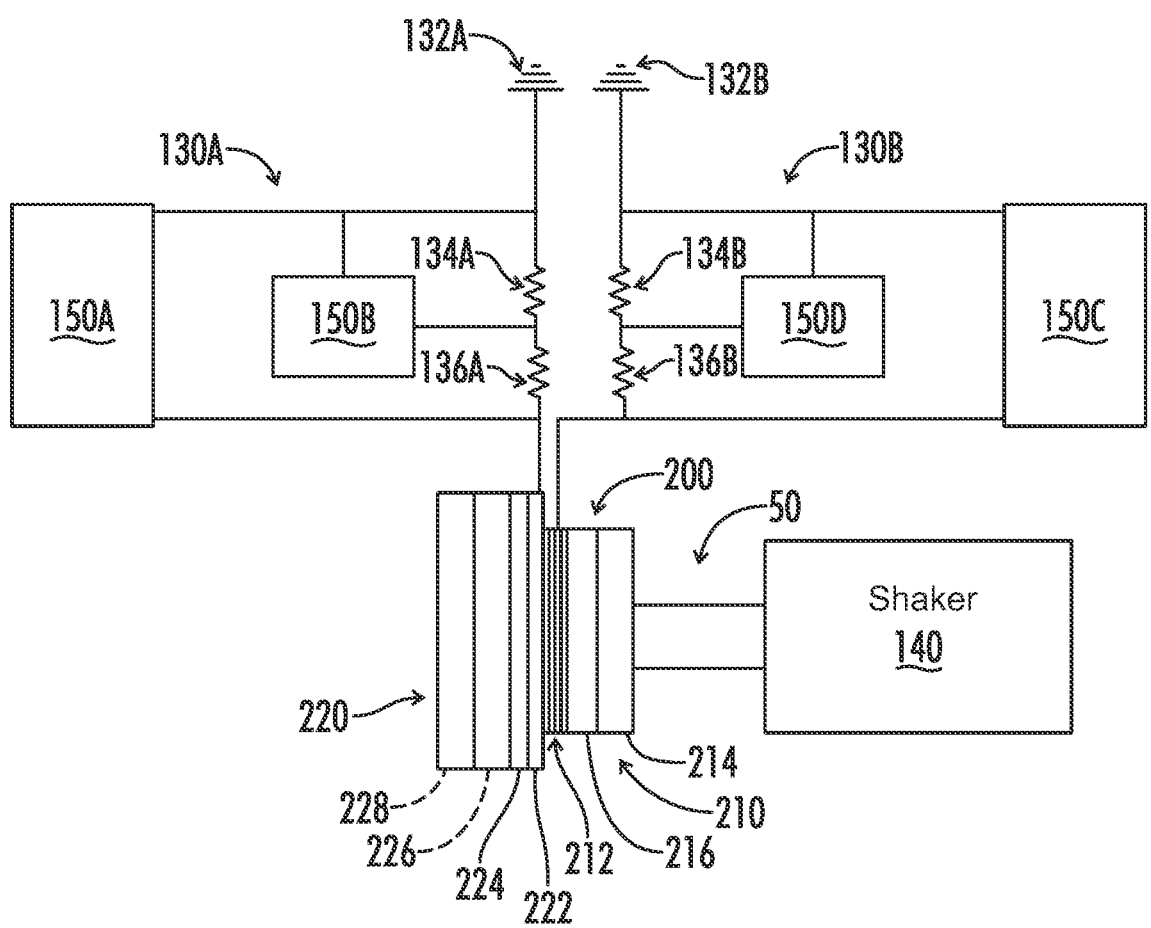
FIG. 5B depicts an exemplary double-electrode TEG with contacting contact members, the TEG driven by a mechanical shaker with power measurements recorded by an oscilloscope, as depicted in FIG. 5A, according to aspects of the present disclosure.

FIG. 5A depicts an exemplary double-electrode TEG 200 with separated contact members 210, 220 (e.g., in first configuration 40). Double-electrode TEG 200 is similar to TEG 100, but additionally includes a non-contact insulating layer 216 between contact layer 212 and conductive layer 214. Contact layer 212 and conductive layer 214 are similar to contact layer 112 and conductive layer 114, respectively, as previously described with respect to TEG 100. Insulating layer 222 and second conductive layer 224 are similar to insulating layer 122 and second conductive layer 124, respectively, as previously described with respect to TEG 100. In the double-electrode TEG 200, both contact members generate power during operation, so TEG 200 may be connected to two separate circuits 130A, 130B to measure power output of TEG 200. Circuits 130A, 130B have similar components previously described with respect to circuit 130 of FIG. 1C. Load resistors 136A, 136B, static resistors 134A, 134B, and grounds 132A, 132B are similar to load resistor 136, static resistor 134, and ground 132 of circuit 130 of FIG. 1C. Additionally, optional foam backing 226 and support 228 can be included on a backside of second contact member 220 in certain examples. FIG. 5B depicts an exemplary double-electrode TEG 200 with contacting contact members (e.g., in second configuration 50). As shown, the respective contact members 210, 220 may come into contact when the double-electrode TEG 200 is in the second configuration 50. Double-electrode TEG 200 can have enhanced power generation capabilities as compared to traditional TENGs in part due to the inclusion of non-contact insulating layer 216 and insulating contact layer 222. Additionally, double-electrode TEG 200 can have enhanced power generation capabilities as compared to traditional TENGs in part due to the use of tacky materials within the respective contact members 210, 220. The use of tacky materials produces more power than traditional TENGs without the need for expensive and complicated nano-scale surface treatments utilized in traditional TENGs in order to maximize friction. In other words, TEG 200 can improve power generation via the triboelectric process by using tacky materials that additionally simplify the design and fabrication of TEG 200 over traditional TENGs.

Figure 5C:
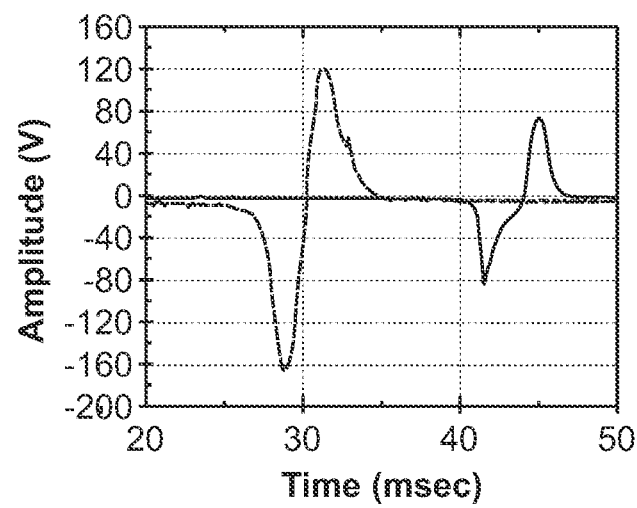
FIG. 5C depicts a comparison of voltage amplitude between an exemplary TEG having an insulating contact layer and a traditional TEG with a conductive contact layer, according to aspects of the present disclosure.
Figure 5D:
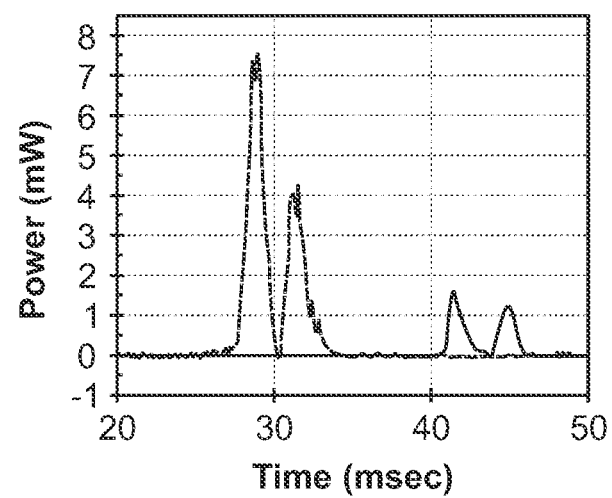
FIG. 5D depicts a comparison of power generation between an exemplary TEG having an insulating contact layer and a traditional TEG with a conductive contact layer, according to aspects of the present disclosure.

FIG. 5C depicts a comparison of voltage amplitude between an exemplary double-electrode TEG 200 having an insulating contact layer 222 and a traditional TENG with a conductive contact layer. As depicted in FIG. 5C, the generated voltage amplitude for TEG 200 is significantly greater than the voltage generated by a traditional double-electrode TENG. FIG. 5D depicts a comparison of power generation between double-electrode TEG 200 and a traditional TENG. The increased power characteristics of double-electrode TEG 200 can be attributed to the inclusion of an insulating contact layer 222 which can act as a Schottky barrier for conductive layer 224, thereby preserving charge on the conductive layer 224 and allowing conductive layer 224 to pull more electrons into contact member 220 from ground 132A. The increased power characteristics of the double-electrode TEG 200 can also be attributed to the use of tacky materials in the contact layer 212 that can increase the amount of triboelectric power generated with each contact-separation cycle.

Figure 6A:
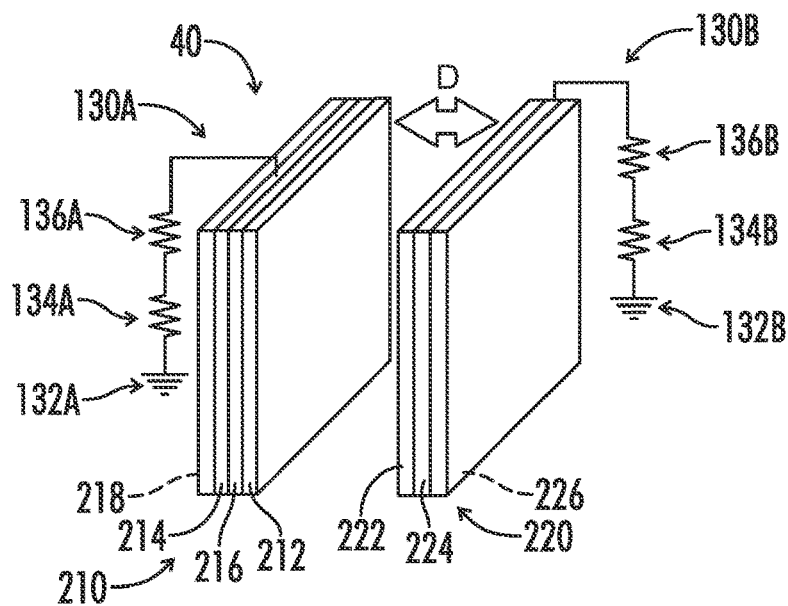
FIG. 6A depicts an exemplary double-electrode TEG with separated contact members, as depicted in FIG. 5A, according to aspects of the present disclosure.
Figure 6B:
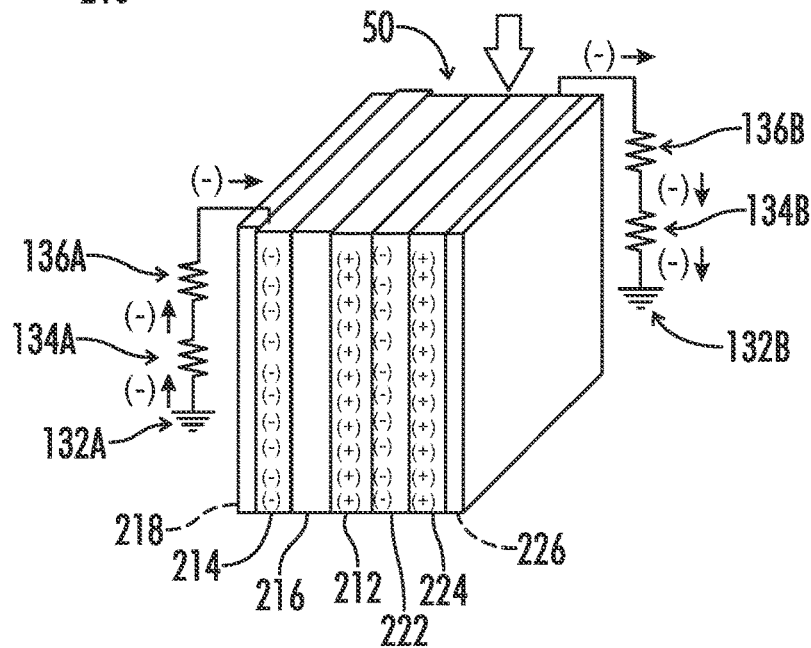
FIG. 6B depicts an exemplary double-electrode TEG with contacting contact members, according to aspects of the present disclosure.
Figure 6C:
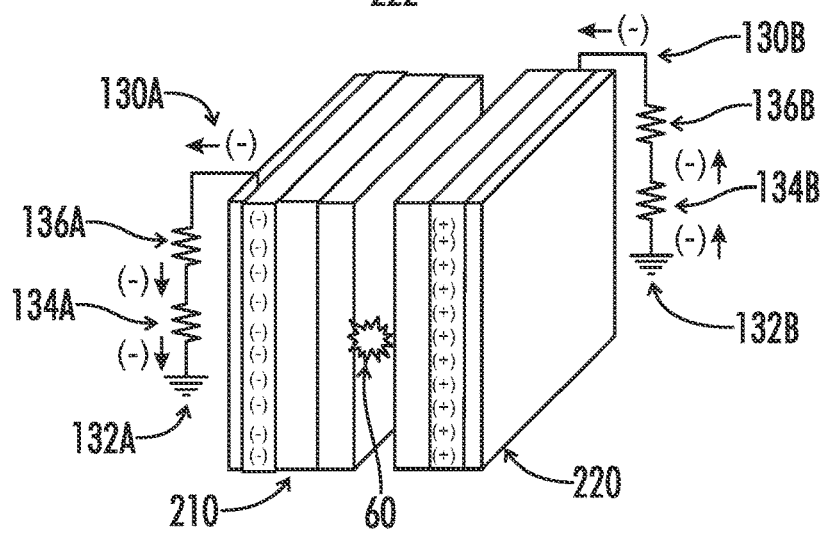
FIG. 6C depicts an exemplary double-electrode TEG with separated contact members during a static discharge process, according to aspects of the present disclosure.

FIGS. 6A-6C depict exemplary double-electrode TEG 200 as it undergoes a separation-contact power cycle and produces a static discharge 60. When double-electrode TEG 200 transitions between the first configuration 40 to the second configuration 50, a positive charge is generated within contact layer 212, and a negative charge is generated in insulating contact layer 222 due to the triboelectric effect as shown in FIG. 6B. The positively charged contact layer 212 can additionally cause a buildup of negative charge on the conductive layer 214 as electrons flow from ground 132A towards conductive layer 214. Similarly, the negatively charged insulating layer 222 can cause the second conductive layer 224 to experience a buildup of positive charge as electrons are pushed towards ground 132B under the influence of the negatively charged insulating layer 222.

In FIG. 6C, upon separation the double-electrode TEG 200 experiences a static discharge 60 between contact layer 212 and insulating contact layer 222. However, as compared to traditional TEGs, the disclosed double-electrode TEG 200 generates more power due to the static discharge 60. As shown in FIG. 6C, the positive charges in contact layer 212 and the negative charges in insulating layer 222 are discharged due to the static discharge 60, but the positive charge on second conductive layer 224 is preserved due to the Schottky barrier formed by the insulating layer 222. Without the influence of the negatively charged insulating layer 222, electrons are caused to flow from the ground 132B towards the positively charged second conductive layer 224, thereby generating more power than traditional TENGs.

Figure 6D:
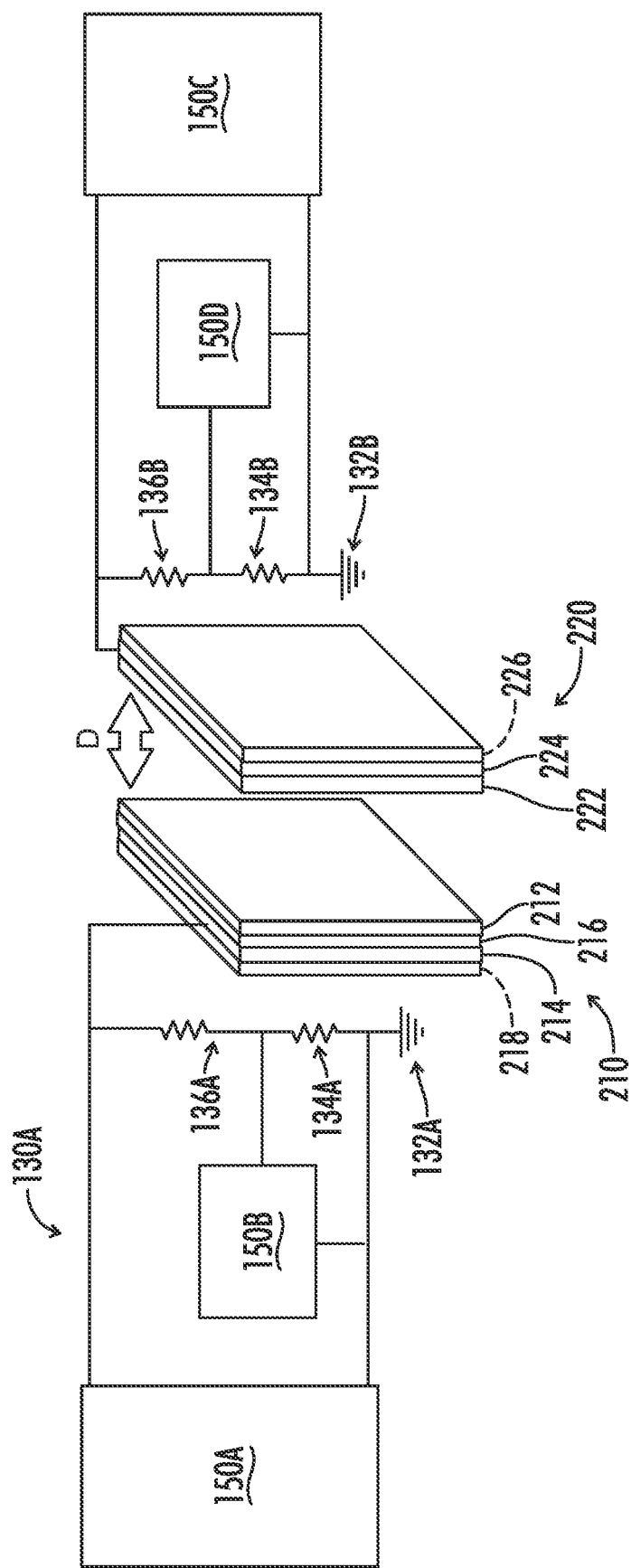
FIG. 6D depicts an exemplary double-electrode TEG with respective contact members connected to respective circuits, according to aspects of the present disclosure.

FIG. 6D depicts an exemplary double-electrode TEG with respective contact members connected to respective circuits, according to aspects of the present disclosure. FIG. 6D is similar to FIGS. 1B and 1C which depicted how a TEG 100 can be connected to circuit 130 in order to measure performance characteristics of TEG 100. In FIG. 6D, performance characteristics (e.g., voltage, current, and power) of double-electrode TEG 200 can be observed using circuits 130A, 130B and oscilloscope 150 (e.g., 150A, 150B, 150C, 150D). For simplicity, shaker 140 is not illustrated but can be attached to the first contact member 210 similarly to the depiction of TEG 100 in FIGS. 1B and 1C.

Figure 6E:
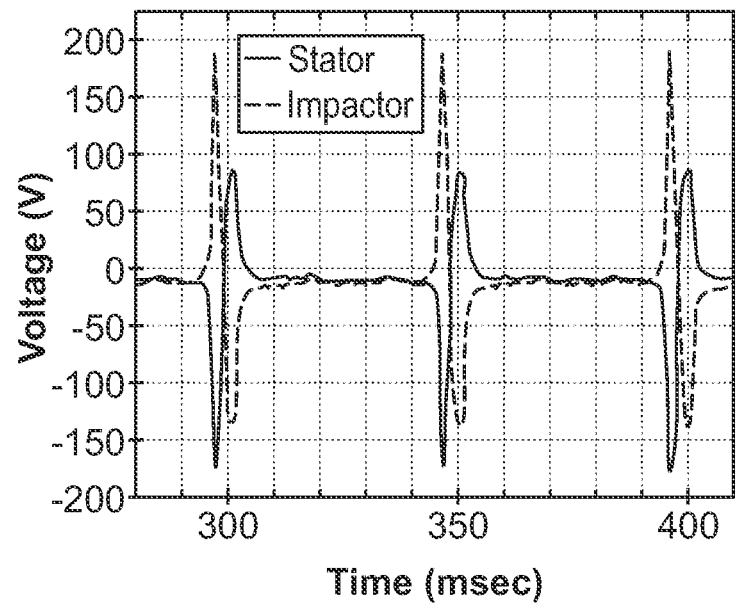
FIG. 6E depicts voltage amplitudes as a function of time for each respective contact member of an exemplary double-electrode TEG, according to aspects of the present disclosure.
Figure 6F:
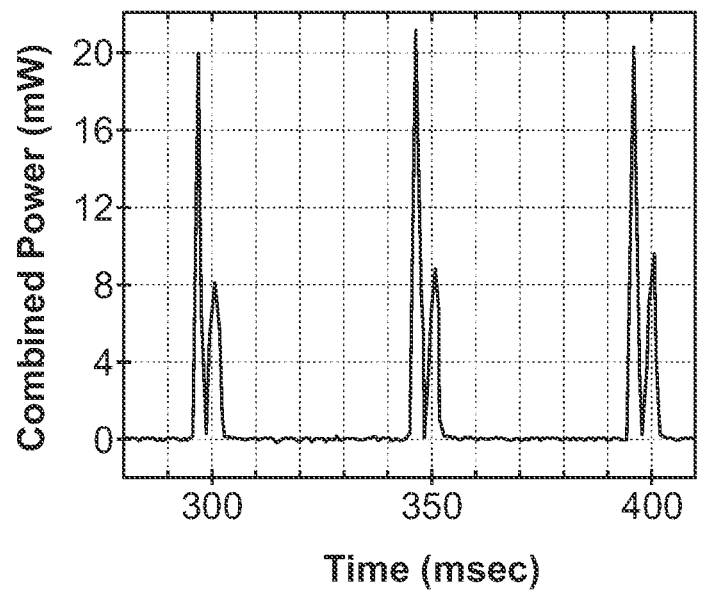
FIG. 6F depicts power generation as a function of time for an exemplary double-electrode TEG, according to aspects of the present disclosure.

FIG. 6E depicts voltage amplitudes as a function of time for each respective contact member of an exemplary double-electrode TEG 200. As shown, voltage is generated by both the first contact member 210 and the second contact member 220. More voltage can be generated by the first conductive layer than the second conductive layer, and both contact members 210, 220 contribute to the total power generation of double-electrode TEG 200. FIG. 6F depicts power generation as a function of time for double-electrode TEG 200. After measuring voltage and current using the setup illustrated in FIG. 6D, combined power can be calculated using Ohm's law. In FIG. 6F, combined power exhibited a peak at approximately 21.2 mW with an associated power density of 17.3 W/m$^2$, which is comparable to traditional TENGs but without having to utilize the added complexity of voltage multiplier circuits, nano-scale surfacing of contact members, or external pumping to obtain such results.

Figure 7A:
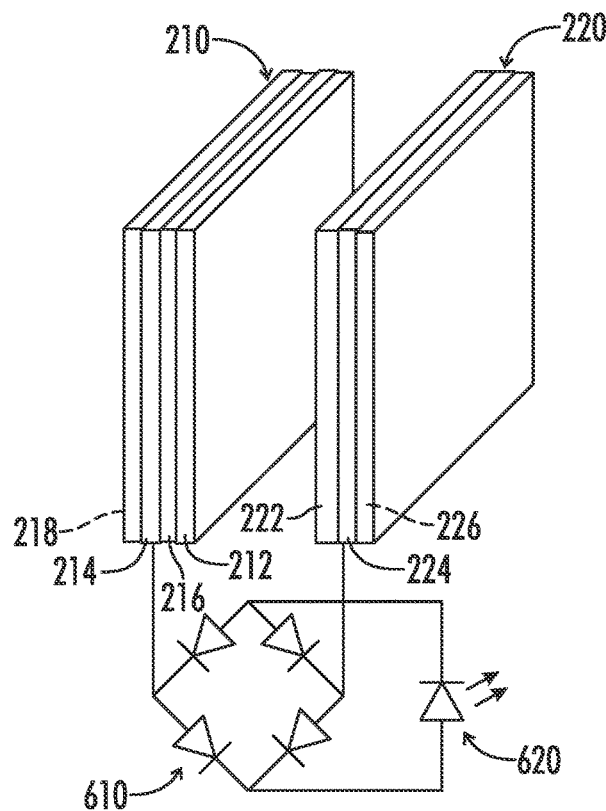
FIG. 7A depicts an exemplary double-electrode TEG setup for DC pulse generation, according to aspects of the present disclosure.

FIG. 7A depicts an exemplary double-electrode TEG 200 setup for DC pulse generation. Both conductive layer 214 of first contact member 210 and second conductive layer 224 of second contact member 220 can be connected to bridge rectifier 610 and LEDs 620 as shown. Bridge rectifier 610 is configured to convert negative voltage supplied by TEG 200 into positive voltage. The LEDs can be powered by operation of double-electrode TEG 200.

Figure 7B:
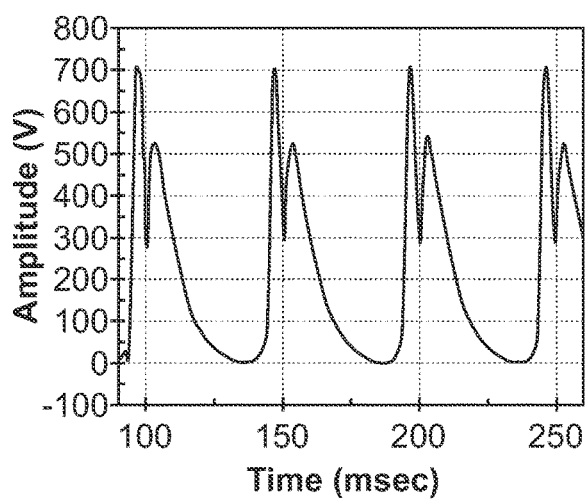
FIG. 7B depicts DC voltage amplitude as a function of time for an exemplary double-electrode TEG setup for DC pulse generation, as shown in FIG. 7A, according to aspects of the present disclosure.
Figure 7C:
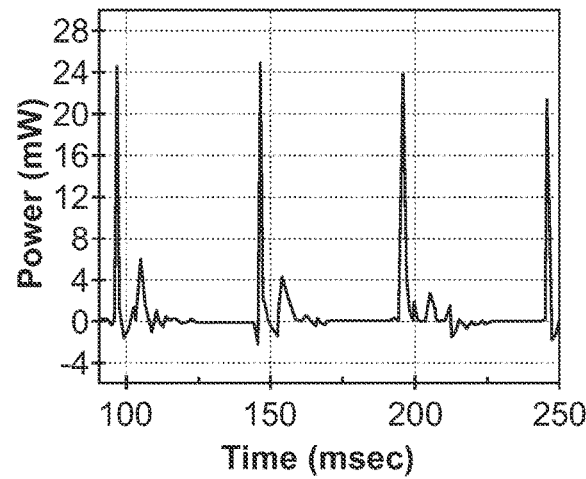
FIG. 7C depicts the corresponding power of a DC pulse generated by the exemplary double-electrode TEG setup for DC pulse generation, as shown in FIG. 7A, according to aspects of the present disclosure.

FIG. 7B depicts DC voltage amplitude as a function of time for an exemplary double-electrode TEG setup for DC pulse generation, as shown in FIG. 7A. As depicted in FIG. 7B, voltage amplitude remains positive due to the effect of the bridge rectifier 610. In FIG. 7C, the corresponding power of a DC pulse generated by the double-electrode TEG 200 is depicted. Peak power of 25 mW was measured during operation of double-electrode TEG 200.

Figure 8A:
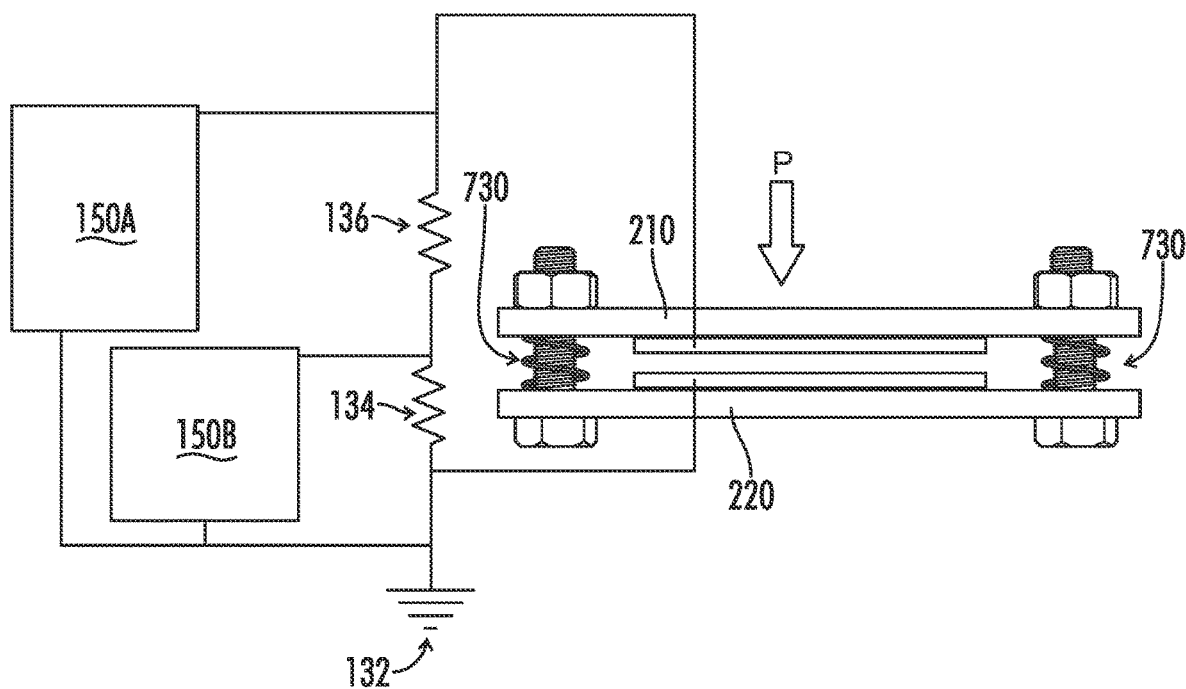
FIG. 8A depicts a side view of a manually operated exemplary TEG with power measurements recorded by an oscilloscope, according to aspects of the present disclosure.

In another example embodiment, exemplary double-electrode TEG 200 can be manually operated as shown in FIG. 8A. Circuit 130 and oscilloscope 150 is the same as previously described with respect to FIGS. 1B, 1C, and 6D. First contact member 210 and second contact member 220 can be held at a gap distance D by two compressive member 730, which can be spring structures that resiliently transition the respective contact members 210, 220 to the first configuration 40 from the second configuration 50. As used herein, the term "resiliently transition" means that compressive members 730 are adapted to return to their original decompressed length and/or shape as the contact members move from second configuration (e.g., contacting configuration) 50 to first configuration (e.g., separate configuration) 40. As an operator provides a contact pressure P, the respective contact members 210 and 220 can be brought together to thereby generate triboelectric charges. In some examples, manually operated TEG 200 can be preferably operated at low frequencies, for example at approximately 4 Hz.

Figure 8B:
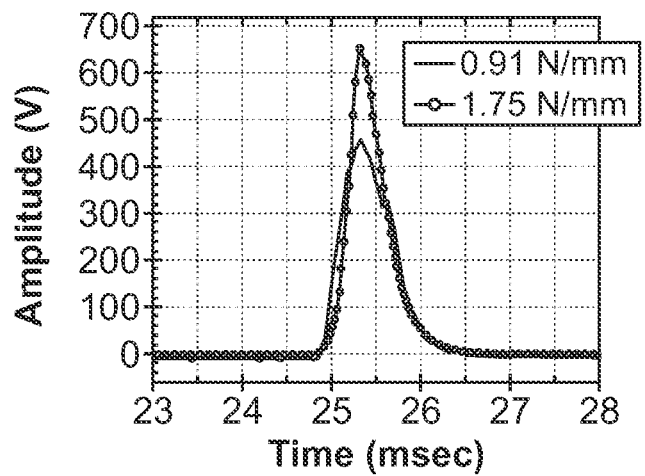
FIG. 8B depicts voltage amplitude as a function of time for a manually operated exemplary TEG as disclosed in FIG. 8A, according to aspects of the present disclosure.
Figure 8C:
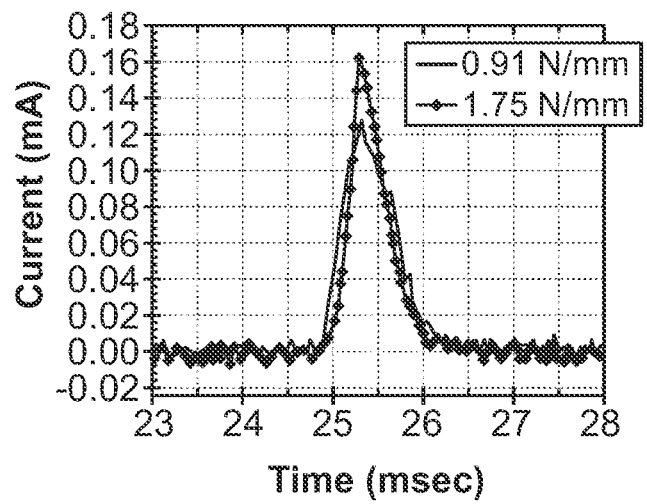
FIG. 8C depicts current as a function of time for a manually operated exemplary TEG as disclosed in FIG. 8A, according to aspects of the present disclosure.
Figure 8D:
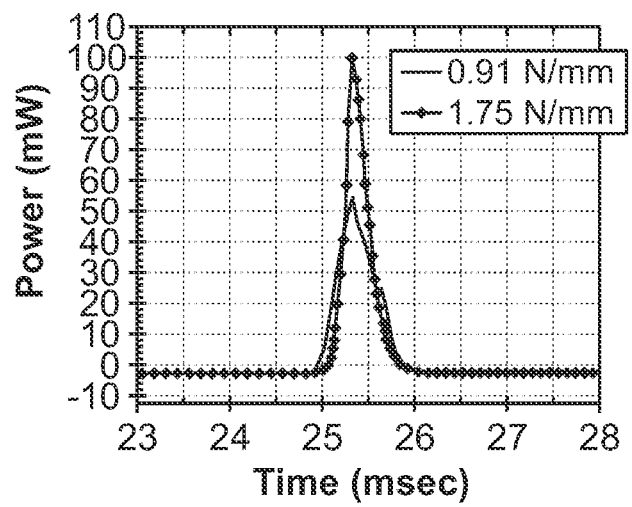
FIG. 8D depicts peak power generation as a function of time for a manually operated exemplary TEG as disclosed in FIG. 8A, according to aspects of the present disclosure.

FIGS. 8B-8D depict output characteristics for manually operated TEG 200 as depicted in FIG. 8A. More specifically, FIG. 8B depicts voltage amplitude as a function of time for two different spring constants of compressive members 730. It can be seen that a higher spring constant for compressive members 730 can yield higher voltage amplitudes. Concurrently, higher current values (FIG. 8C) and higher power values (FIG. 8D) are exhibited for a manually operated TEG 200 which utilizes compressive members 730 with a higher spring constant.

Figure 9A:
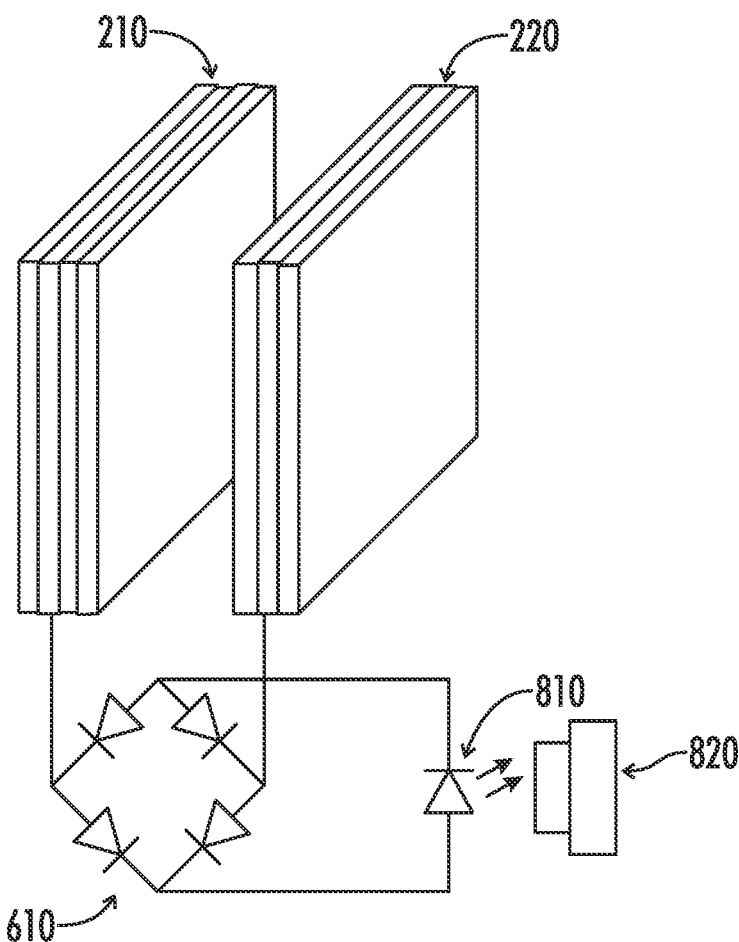
FIG. 9A depicts another exemplary double-electrode TEG setup for DC pulse generation, according to aspects of the present disclosure.
Figure 9B:
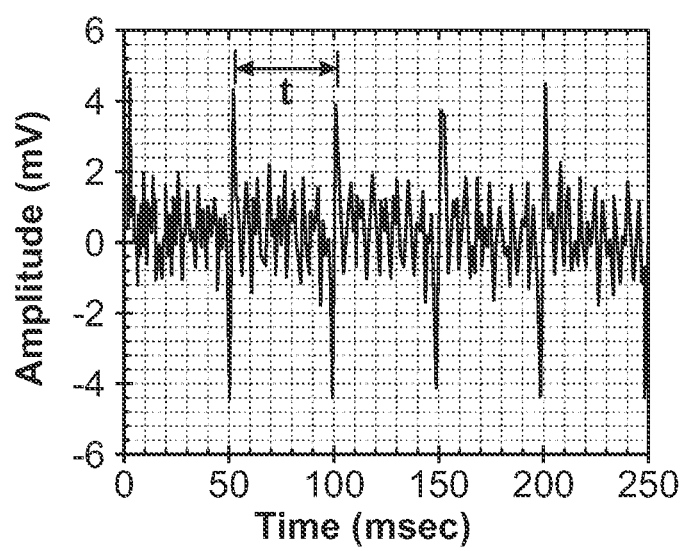
FIG. 9B depicts emission of a diode laser powered by the exemplary double-electrode TEG shown in FIG. 9A, according to aspects of the present disclosure.

FIG. 9A depicts another exemplary double-electrode TEG setup for DC pulse generation. In contrast to FIG. 7A, the load resistor being used to assess performance of TEG 200 in FIG. 9A is a laser diode 810 in place of LEDs 620. A photodetector 820 can be utilized to measure the performance of laser diode 810 when powered by double-electrode TEG 200. In some examples, the laser diode 810 is configured to produce lasing at approximately 650 nm. FIG. 9B depicts the stimulated output of laser diode 810. A 50 ms duration time t was measured for the output of the laser diode 810 by the photodetector 820, showing that TEG 200 is capable of overcoming of the lasing threshold is observed from the laser diode 810, which has not been replicated with previously proposed TENG designs.

Figure 10:
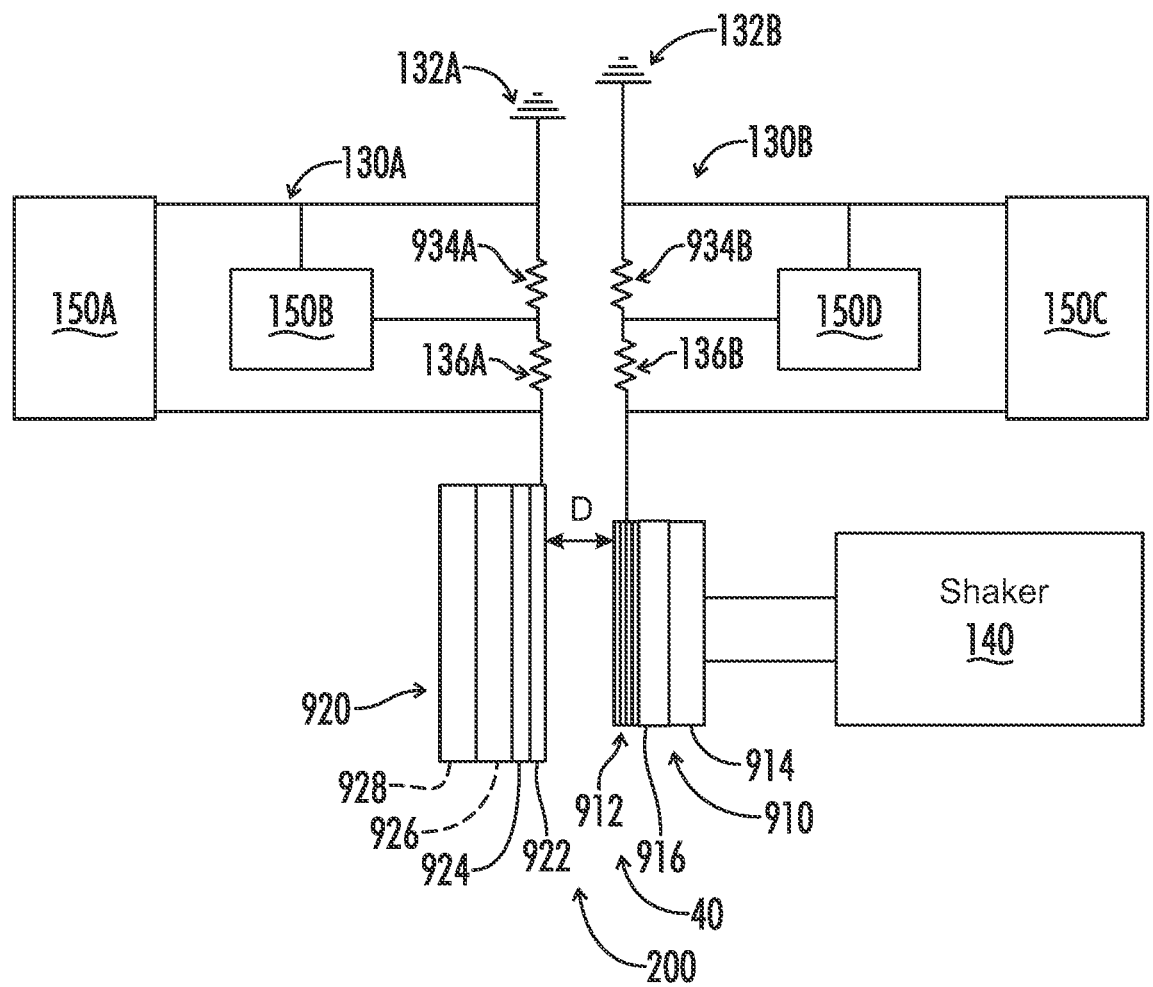
FIG. 10 depicts an exemplary double-electrode TEG with a nanosize mineral crystal grain contact layer, according to aspects of the present disclosure.

In another example embodiment and as shown in FIG. 10, a TEG 900 is disclosed having a nanosize mineral crystal grain contact layer. It has been previously described that TEG 100 and double electrode TEG 200 exhibit favorable output characteristics in part because of the inclusion of an insulating contact layer 122, 222 which can act as a Schottky barrier during TEG operation and increase power output by preserving charge of the second conductive layer 114, 224. Another reason for the improved output characteristics of the disclosed TEGs 100, 200, 900 over previous TENGs is the use of a tacky material as the contact layer 112, 212. Tackiness of the material increases the triboelectric charges generated during operation of TEG 100, 200. However, tackiness of a material also increases the forces required to separate the respective contact members of TEG 100, 200. Accordingly, despite energy yield increasing when utilizing tackier materials for contact layer 112, 212, there can exist an inflection point after which the increase in separation forces associated with tacky materials overcomes the increased triboelectric effect of the tacky material.

TEG 900, as depicted in FIG. 10, addresses these and other considerations. TEG 900 can include first contact member 910 and second contact member 920. TEG 900 is shown in tandem with a shaker 140 and circuits 130, as similarly as previously described with respect to TEG 200 and FIGS. 5A and 5B. Circuits 130 and oscillator 150 are similar to those described with respect to FIGS. 5A and 5B, and a full description of these components is omitted here for brevity with the exception of static resistors 934A and 934B. In contrast to static resistors 134, 134A, 134B, static resistors 934A, 934B can have a higher resistance, preferably between approximately 200 ohms and approximately 2000 ohms, most preferably approximately 1000 ohms.

First contact member 910 can include a nanosize mineral crystal grain contact layer 912, a non-contact insulating layer 916, and a conductive layer 914. Second contact member 920 can include an insulating contact layer 922, a second conductive layer 924, and may optionally include a foam backing 926 and support 928. Nanosize mineral crystal grain contact layer 912 is similar to contact layers 112 and 212 previously described with respect to TEGs 100, 200. However, nanosize mineral crystal grain contact layer 912 can have a lower tackiness with when compared to contact layers 112, 212. Accordingly, nanosize mineral crystal grain contact layer 912 can be characterized by a lower separation force required to pull respective contact members 910, 920 apart. Nanosize mineral crystal grain contact layer 912 may also generate less triboelectric charge than contact layers 112, 212 because of the reduced tackiness of nanosize mineral crystal grain contact layer 912 as compared to contact layers 112, 212. However, nanosize mineral crystal grain contact layer 912 can generate additional charges due to pressure stimulated current. That is, nanosize mineral crystal grain contact layer 912 can generate charge in response to experiencing a compressive force during operation of TEG 900. In some examples, the reduced separation force associated with nanosize mineral crystal grain layer 912 and the pressure stimulated current phenomenon allows TEG 900 to generate more electric current per cycle as compared to TEGs 100, 200, with the additional benefit of being capable of operating at higher frequencies due to the reduced separation force associated with nanosize mineral crystal grain contact layer 912. According to some examples, TEG 900 can be operated at frequencies up to 100 Hz. Nanosize mineral crystal grain contact layer 912 can be of any suitable material. In some examples, nanosize mineral crystal grain contact layer 912 can be a putty material having mineral nanocrystals embedded within. In certain examples, the putty material of nanosize mineral crystal grain contact layer 912 can have nanosize mineral crystal grains at a rate of about 50% to about 60% by weight embedded within the putty, although other percentages can be utilized in order to maximize generation of electricity by pressure stimulated current generation. The nanocrystal material of nanosize mineral crystal grain contact layer 912 can be selected to optimize pressure stimulated current generation while still offering favorable triboelectric charge generation and low separation force. For example, nanosize mineral crystal grain contact layer 912 can be constructed of a putty material containing nanocrystals of limestone, marble, and/or sandstone. In a preferred embodiment nanosize mineral crystal grain contact layer 912 includes calcite (i.e., $CaCO_3$) nanocrystals. Non-contact insulating layer 916, conductive layer 914, insulating contact layer 922, foam backing 926 and support 928 are similar to non-contact insulating layer 216, conductive layer 214, insulating contact layer 222, foam backing 226 and support 228 of TEG 200 and therefore a full description is omitted here for brevity.

Figure 11A:
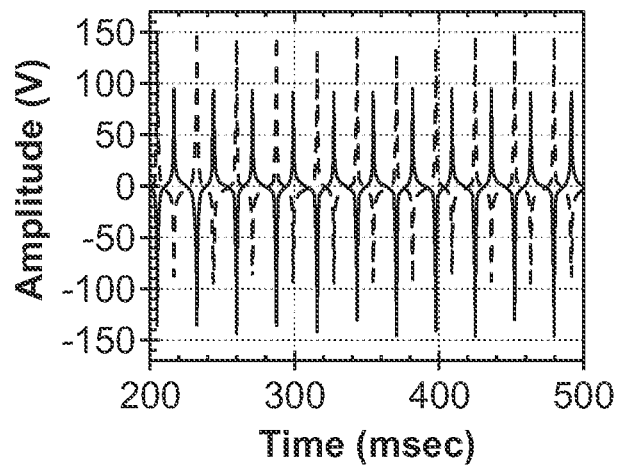
FIG. 11A depicts the voltage amplitude as a function of time of respective contact members of the exemplary double-electrode TEG as shown in in FIG. 10, according to aspects of the present disclosure.
Figure 11B:
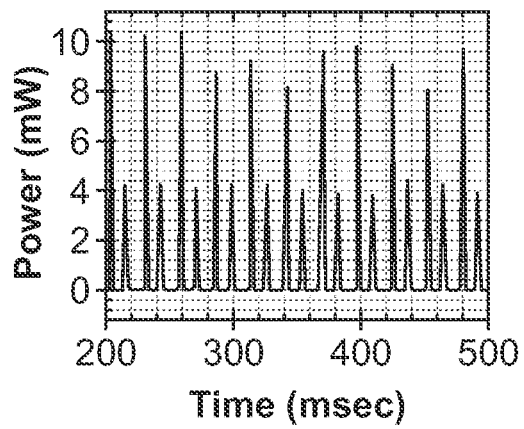
FIG. 11B depicts the combined power generated by the respective contact members of the exemplary double-electrode TEG as shown in FIG. 10, according to aspects of the present disclosure.
Figure 11C:
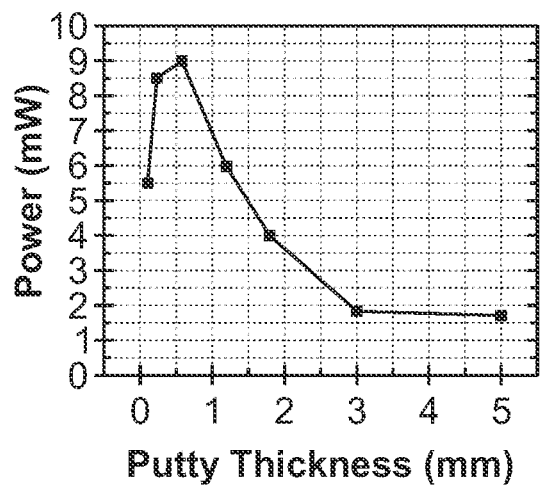
FIG. 11C depicts peak power as a function of thickness of the nanosize mineral crystal grain contact layer of the exemplary double-electrode TEG as shown in FIG. 10, according to aspects of the present disclosure.

FIG. 11A depicts voltage amplitude as a function of time for respective contact members 910, 920 of TEG 900. For this measurement, TEG 900 was operated at approximately 40 Hz, and a nanosize mineral crystal grain contact layer of approximately 0.6 mm of thickness was selected. Voltage generated by contact members 910, 920 were similar but with opposite sign. FIG. 11B depicts combined power as a function of time for respective contact members 910, 920 of TEG 900. As can be seen in FIG. 11B, peak power can reach approximately 10 mW which can translate to a power density of approximately 16 $W/m^2$. FIG. 11C depicts the relationship between peak power as a function of the thickness of nanosize mineral crystal grain contact layer 912. As shown, optimal power generation can occur at approximately 0.6 mm nanosize mineral crystal grain contact layer 912 thickness. In other words, a thinner nanosize mineral crystal grain contact layer 912 reduces the contribution of pressure stimulated current from nanosize mineral crystal grain contact layer 912, while a thicker nanosize mineral crystal grain contact layer can also cause a reduction in pressure stimulated current due to an increase in the distance between charges generated between conductive layer 914 and nanosize mineral crystal grain contact layer 912.

Figure 12A:
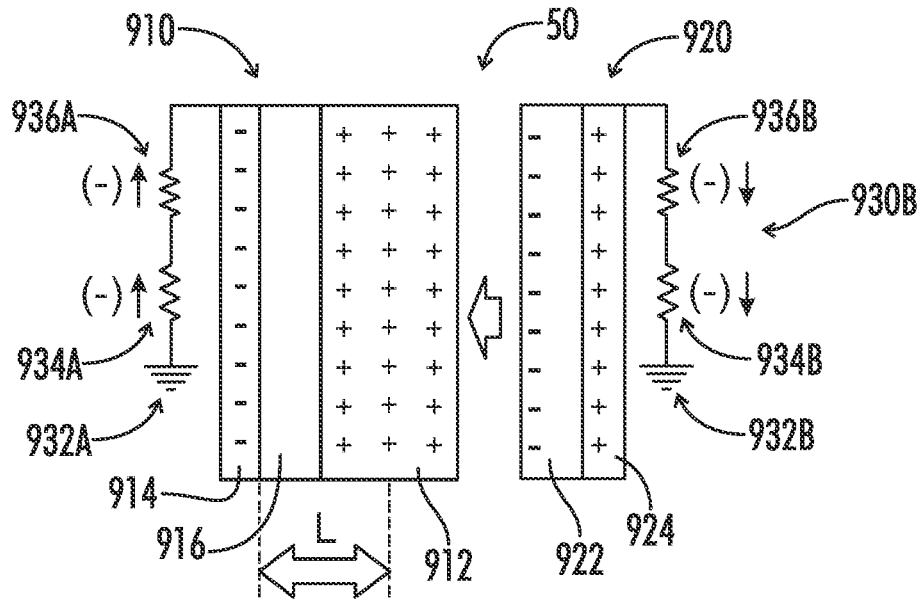
FIG. 12A depicts an exemplary double-electrode TEG with a nanosize mineral crystal grain contact layer exhibiting charge generation as the respective contact members are brought into contact, according to aspects of the present disclosure.
Figure 12B:
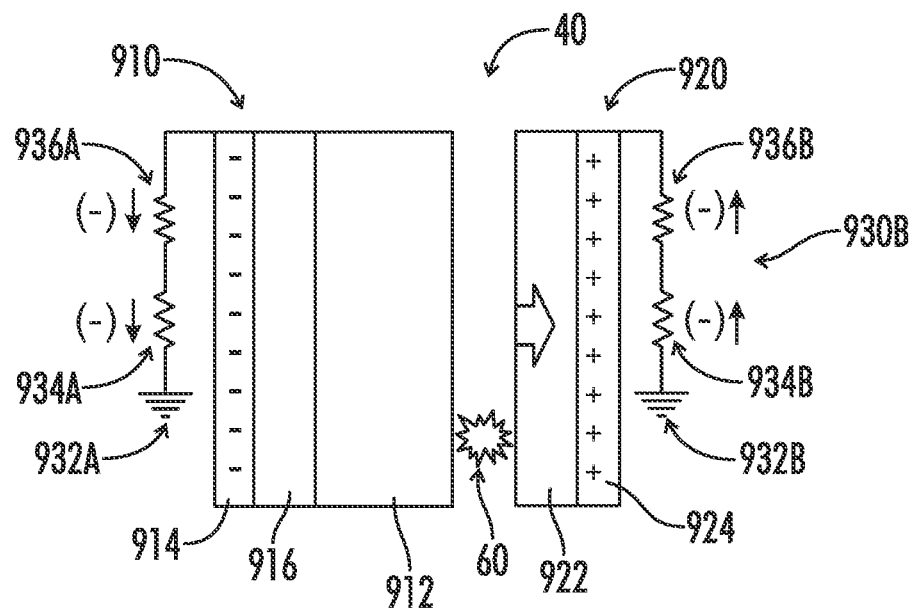
FIG. 12B depicts an exemplary double-electrode TEG with a nanosize mineral crystal grain contact layer exhibiting static discharge as the respective contact members are separated from contact, according to aspects of the present disclosure.

FIGS. 12A-12B depict TEG 900 charge generation during operation. In FIG. 12A, positive charges can be generated in nanosize mineral crystal grain contact layer 912 of first contact member 910 and negative charges can be generated in insulating contact layer 922 of second contact member 920. The positive charges in nanosize mineral crystal grain contact layer 912 can induce a negative charge in conductive layer 914 by pulling electrons from ground 932A into conductive layer 914. Similarly, a positive charge can be induced in second conductive layer 924 by the negative charges of insulating contact layer 922 characterized by electrons flowing out of second conductive layer 924 and towards ground 932B. In FIG. 12B, a static discharge 60 can occur between nanosize mineral crystal grain contact layer 912 and insulating contact layer 922. In some examples, insulating contact layer 922 can act as a Schottky barrier to second conductive layer 924, thereby preserving the positive charge on second conductive layer 924. The preserved positive charge on second conductive layer 924 can lead to electrons flowing towards second conductive layer 924 from ground 932B, which can increase generated power for TEG 900. Similarly, preserved negative charge of conductive layer 914 can cause electrons to flow towards ground 932A and out of conductive layer 914.

Figure 13:
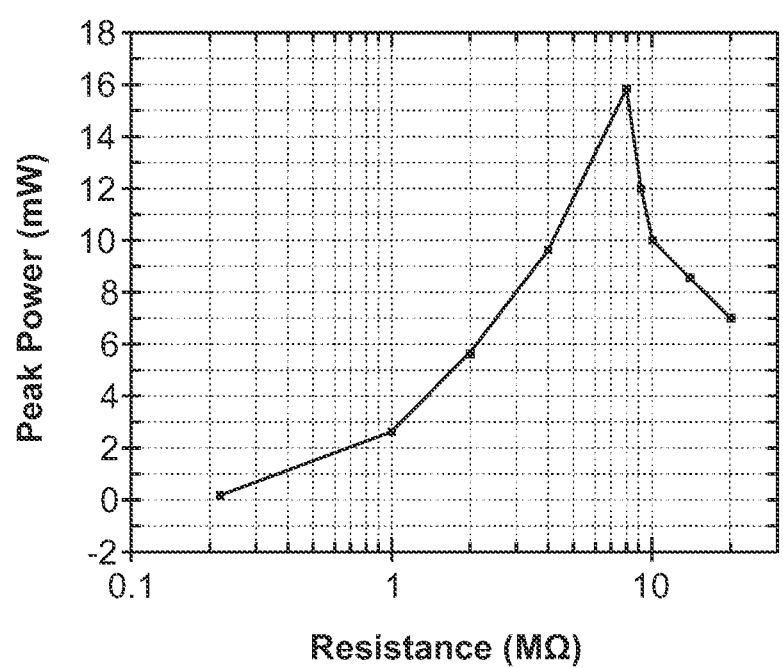
FIG. 13 depicts peak power value of an exemplary double-electrode TEG with a nanosize mineral crystal grain contact layer as a function of load resistance, according to aspects of the present disclosure.

FIG. 13 depicts peak power of TEG 900 as a function of values for load resistor 936. As shown, peak power for TEG 900 can have a peak at approximately an 8 mega ohm resistance value for load resistor 936. Peak power shown in FIG. 13 can correspond to a power density of approximately 25.6 W/m$^2$.

Figure 14A:
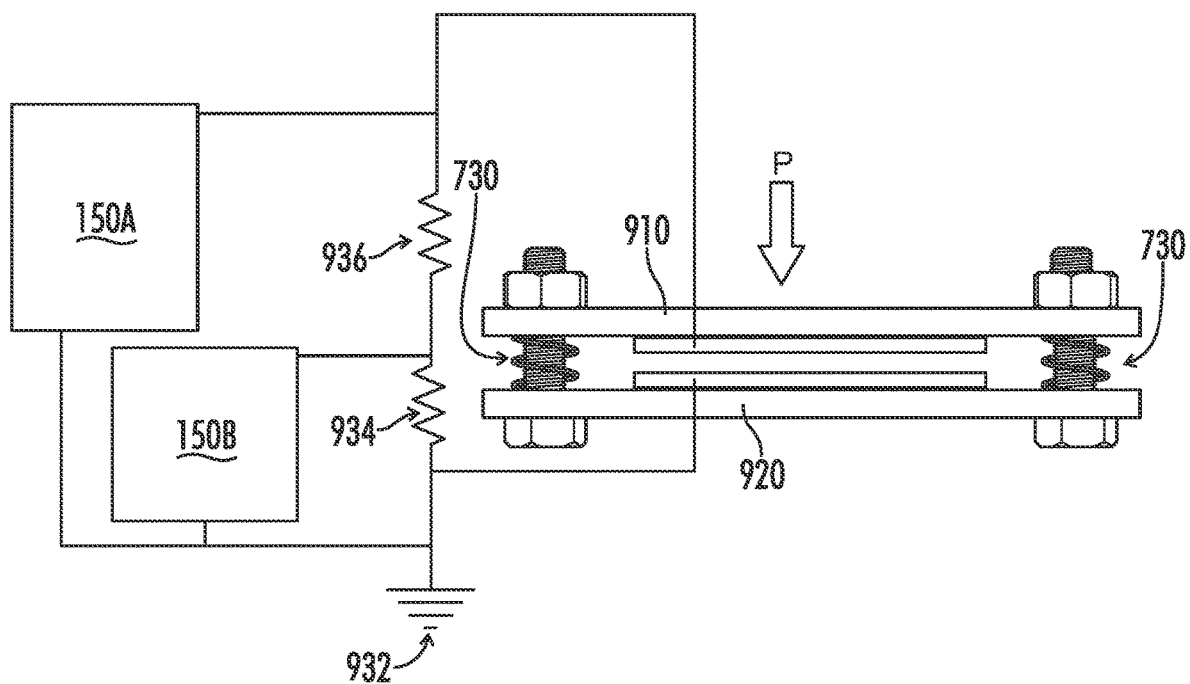
FIG. 14A depicts a side view of a manually operated exemplary double-electrode TEG with a nanosize mineral crystal grain contact layer with power measurements recorded by an oscilloscope, according to aspects of the present disclosure.

FIG. 14A depicts a side view of a manually operated TEG 900 with power measurements recorded by an oscilloscope. In some examples, TEG 900 can be manually operated as shown in FIG. 14A. Circuit 930 and oscilloscope 150 can be the same as previously described with respect to FIG. 10. First contact member 910 and second contact member 920 can be held at a gap distance D by two compressive member 730, which can be spring structures that resiliently transition the respective contact members 910, 920 to the first configuration 40 from the second configuration 50. As used herein, the term "resiliently transition" means that compressive members 730 are adapted to return to their original decompressed length and/or shape as the contact members move from second configuration (e.g., contacting configuration) 50 to first configuration (e.g., separate configuration) 40. As an operator provides a contact pressure P, the respective contact members 910 and 920 can be brought together to thereby generate triboelectric charges and pressure stimulated charges within nanosize mineral crystal grain contact layer 912. In some examples, manually operated TEG 900 can be preferably operated at low frequencies, for example at approximately 3 Hz.

Figure 14B:
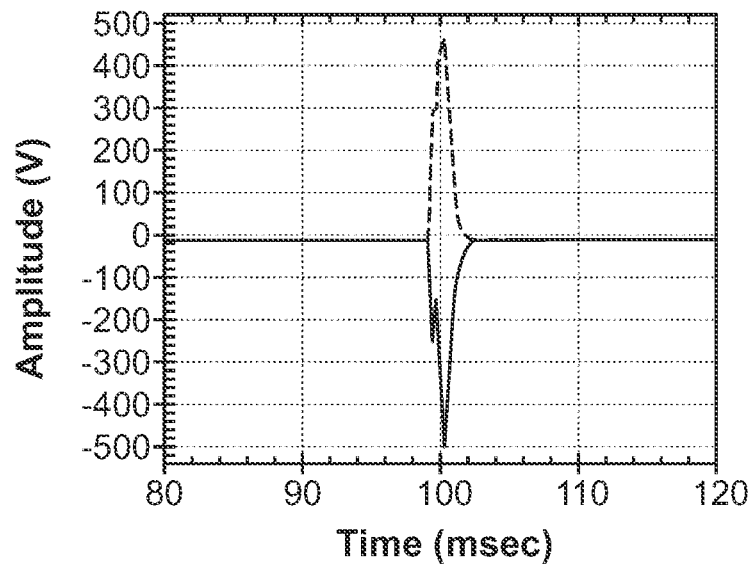
FIG. 14B depicts voltage amplitudes of the respective contact members of an exemplary double-electrode TEG with a nanosize mineral crystal grain contact layer as a function of time, according to aspects of the present disclosure.
Figure 14C:
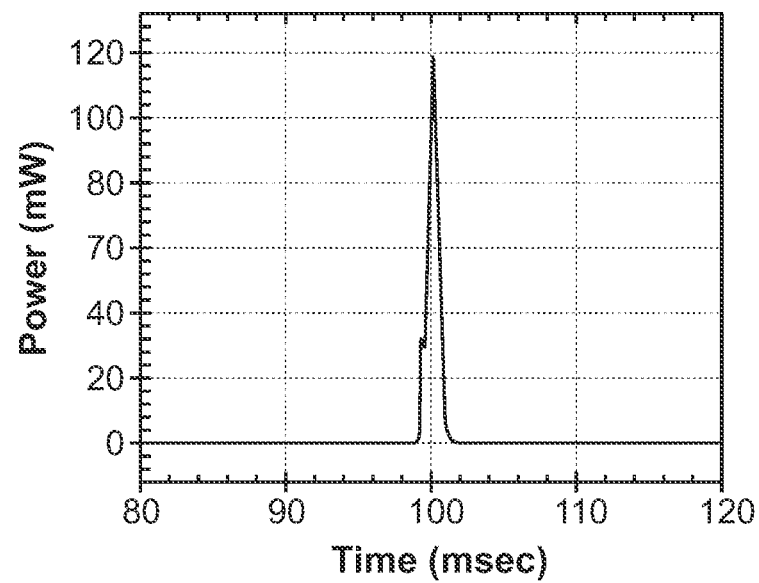
FIG. 14C depicts combined power of the respective contact members of the exemplary double-electrode TEG with a nanosize mineral crystal grain contact layer as a function of time, according to aspects of the present disclosure.

FIGS. 14B and 14C depict output characteristics of TEG 900. More specifically, FIG. 14B depicts voltage amplitudes of the respective contact members of TEG 900 as a function of time and FIG. 14C depicts power characteristics of the respective contact members of TEG 900 as a function of time. FIG. 14B shows that respective contact members 910, 920 generate similar voltages but with opposite signs. FIG. 14C shows combined power generation for TEG 900. Power generation was shown to peak at approximately 120 mW with a 50 mm×50 mm contact area between the respective contact members 910, 920. The power density for TEG 900 in the manual generation embodiment as shown in FIG. 14A was calculated to be approximately 48 W/m$^2$. The higher power density of the manually generator as compared to the shaker embodiment can be attributed to the ability of the compressive members 730 to separate the respective contact members 910, 920 faster than shaker 140 is capable of.

Figure 15:
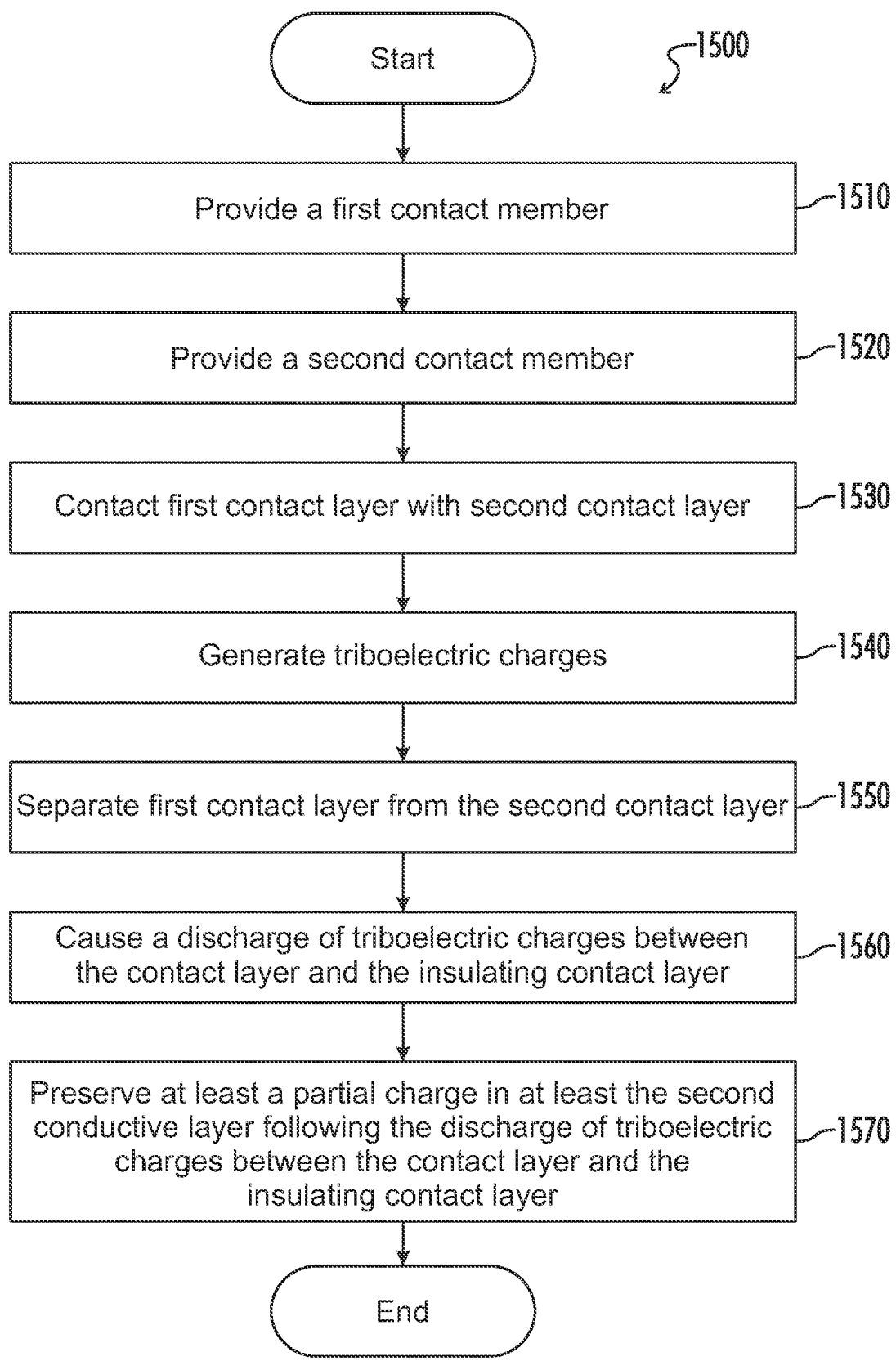
FIG. 15 is a flowchart demonstrating an exemplary method for operating a triboelectric generator, according to aspects of the present disclosure.

FIG. 15 is a flowchart demonstrating an exemplary method for operating a triboelectric generator, according to aspects of the present disclosure. The method of FIG. 15 can be implemented using any of the previously disclosed TENG devices, include TEG 100, TEG 200, and/or TEG 900 in either a manually operated mode or shaker mode as previously described herein. In block 1510, the method can include providing a first contact member 110, 210, 910. The contact member 110, 210, 910 can include some or all of the components previously described with respect to TEG 100, 200, 900. For example, first contact member 110 can include contact layer 112, conductive layer 114, and non-contact insulating layer 116. First contact member 210 can include contact layer 212, conductive layer 224, and non-contact insulating layer 216. First contact member 910 can include nanosize mineral crystal grain contact layer 912, conductive layer 914, and non-contact insulating layer 916.

In block 1520, the method can include providing a second contact member 120, 220, 920. Second contact member 120 can include insulating contact layer 122, second conductive layer 124, optional foam backing 126, and optional support 128. Second contact member 220 can include insulating contact layer 222, second conductive layer 224, optional foam backing 226, and optional support 228. Second contact member 920 can include insulating contact layer 922, second conductive layer 924, optional foam backing 926, and optional support 928.

In block 1530, the method can include contacting the first contact layer 110, 210, 910 with second contact layer 120, 220, 920. For example, the respective contact members can be moved from a first configuration 40 in which the respective contact members are spaced apart from one another by a gap distance D to a second configuration 50 in which the respective contact members are brought into contact.

In block 1540, the method can include generating triboelectric charges. For example, contact layers 112, 212, 912 can generate positive triboelectric charges while insulating contact layers 122, 222, and 922 can generate negative triboelectric charges.

In block 1550, the method can include separating the first contact layer from the second contact layer. For example, the respective contact members can be moved from the second configuration 50 to the first configuration 40 in which the contact members are again spaced apart from each other by the gap distance D.

In block 1560, the method can include causing a discharge of triboelectric charges between the contact layer 112, 212, and 912 and the insulating contact layers 122, 222, and 922. For example, the positive triboelectric charges of 112, 212, and 912 and the negative triboelectric charges 122, 222, and 922 can discharge one another, leaving no charge on contact layer 112, 212, and 912 and insulating contact layer 122, 222, 922.

In block 1570, the method can include preserving at least a partial charge in at least the second conductive layer 124, 224, 924 following the discharge of triboelectric charges between the contact layer 112, 212, 912 and the insulating contact layer 122, 222, 922. For example, the insulating contact layer 122, 222, 922 can act as a Schottky barrier that acts to preserve the charge on the second conductive layer 124, 224, 924 following a static discharge 60.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices, and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

The terms "about" and "approximately" shall generally mean an acceptable degree of error or variation for the quantity measured given the nature or precision of the measurements. Typical, exemplary degrees of error or variation are within 20 percent (%), preferably within 10%, more preferably within 5%, and still more preferably within 1% of a given value or range of values. Numerical quantities given in this description are approximate unless stated otherwise, meaning that the term "about" or "approximately" can be inferred when not expressly stated.

With reference to the use of the word(s) "comprise," "comprises," and "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and/or the following claims.

The term "including" should be interpreted to mean "including but not limited to . . . " unless the context clearly indicate otherwise.

The term "consisting essentially of" means that, in addition to the recited elements, what is claimed may also contain other elements (steps, structures, ingredients, components, etc.) that do not adversely affect the operability of what is claimed for its intended purpose. Such addition of other elements that do not adversely affect the operability of what is claimed for its intended purpose would not constitute a material change in the basic and novel characteristics of what is claimed.

The term "adapted to" means designed or configured to accomplish the specified objective, not simply able to be made to accomplish the specified objective.

The term "capable of" means able to be made to accomplish the specified objective.

The terminology used herein is for the purpose of describing particular embodiments only and is not intended to be limiting. As used herein, the singular forms "a", "an" and "the" are intended to include the plural forms as well (i.e. "at least one"), unless the context clearly indicates otherwise.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Terms such as "at least one of A and B" should be understood to mean "only A, only B, or both A and B." The same construction should be applied to longer list (e.g., "at least one of A, B, and C").

What is claimed is:

1. A generator comprising:
   respective contact members comprising a first contact member and a second contact member, the respective contact members being movable with respect to each other such that in a first configuration the respective contact members separate from each other and in a second configuration the respective contact members contact each other;
   the first contact member comprising:
      a first conductive layer; and
      a contact layer adjacent to the first conductive layer, wherein the contact layer is composed of a mineral crystal grain material;
   the second contact member spaced apart from the first contact member in the first configuration, the second contact member comprising:
      an insulating contact layer; and
      a second conductive layer adjacent to the insulating contact layer;
   wherein the insulating contact layer is configured to come into contact with the contact layer of the first contact member in the second configuration; and
   wherein transition of the respective contact members from the first configuration to the second configuration creates triboelectric charges.

2. The generator of claim 1, wherein the insulating contact layer comprises a Schottky barrier.

3. The generator of claim 1, wherein the first contact member further comprises an insulating layer disposed between the first conductive layer and the contact layer.

4. The generator of claim 1, further comprising a vibration controller coupled to the respective contact members and configured to cause the respective contact members to transition from the first configuration to the second configuration.

5. The generator of claim 1, further comprising one or more compressive members in a compressed state in the second configuration and configured to cause the respective contact members to resiliently return to the first configuration from the second configuration.

6. A generator comprising:
   respective contact members comprising a first contact member and a second contact member, the respective contact members being movable with respect to each other such that in a first configuration the respective contact members separate from each other and in a second configuration the respective contact members contact each other;
   the first contact member comprising:
      a first conductive layer;
      a non-contact insulating layer adjacent to the first conductive layer; and
      a contact layer adjacent to the non-contact insulating layer, wherein the contact layer is composed of a mineral crystal grain material, and wherein the non-contact insulating layer is disposed between the first conductive layer and the contact layer;
   a second contact member spaced apart from the first contact member in the first configuration, the second contact member comprising:
      an insulating contact layer; and
      a second conductive layer adjacent to the insulating contact layer;
   wherein the insulating contact layer is configured to come into contact with the contact layer of the first contact member in the second configuration; and wherein transition of the respective contact members from the first configuration to the second configuration creates triboelectric charges.

7. The generator of claim 6, wherein the insulating contact layer comprises a Schottky barrier.

8. The generator of claim 6, further comprising a vibration controller coupled to the respective contact members and configured to cause the respective contact members to transition from the first configuration to the second configuration.

9. The generator of claim 6, further comprising one or more compressive members in a compressed state in the second configuration and configured to cause the respective contact members to resiliently return to the first configuration from the second configuration.

10. A method of operating a triboelectric generator, comprising:
    providing a first contact member comprising a contact layer and a first conductive layer adjacent to the first conductive layer, wherein the contact layer is composed of a mineral crystal grain material;
    providing a second contact member comprising an insulating contact layer and a second conductive layer adjacent to the insulating contact layer;
    contacting the first contact layer with the second contact layer;
    generating triboelectric charges from contacting the first contact layer with the second contact layer;
    separating the first contact layer from the second contact layer;
    causing a discharge of triboelectric charges between the contact layer and the insulating contact layer; and
    preserving at least a partial charge in at least the second conductive layer following the discharge of triboelectric charges between the contact layer and the insulating contact layer.

11. The method of claim 10, wherein the preserved at least partial charge in at least the second conductive layer is effective to increase power generation of the triboelectric generator by causing an influx of electrons into the second conductive layer.

12. The method of claim 10, further comprising generating pressure stimulated current in the contact layer in response to contacting the first contact layer with the second contact layer.

13. The method of claim 10, wherein the insulating contact layer comprises a Schottky barrier.

* * * * *